US012610095B2

(12) United States Patent
Saraiya et al.

(10) Patent No.: US 12,610,095 B2
(45) Date of Patent: Apr. 21, 2026

(54) AUTOMATED QUALITY CONTROL ANALYSIS OF MEDIA CONTENT

(71) Applicant: Roku, Inc., San Jose, CA (US)

(72) Inventors: Shailin Saraiya, San Jose, CA (US);
Linfeng Yan, San Jose, CA (US);
Yiming Han, Palo Alto, CA (US)

(73) Assignee: Roku, Inc., San Jose, CA (US)

( * ) Notice: Subject to any disclaimer, the term of this patent is extended or adjusted under 35 U.S.C. 154(b) by 98 days.

(21) Appl. No.: 18/795,541

(22) Filed: Aug. 6, 2024

(65) Prior Publication Data

US 2026/0046464 A1     Feb. 12, 2026

(51) Int. Cl.
| | |
|---|---|
| *H04N 21/24* | (2011.01) |
| *H04N 21/231* | (2011.01) |
| *H04N 21/233* | (2011.01) |
| *H04N 21/234* | (2011.01) |
| *H04N 21/845* | (2011.01) |

(52) U.S. Cl.
CPC ....... *H04N 21/2407* (2013.01); *H04N 21/231* (2013.01); *H04N 21/233* (2013.01); *H04N 21/23418* (2013.01); *H04N 21/8456* (2013.01)

(58) Field of Classification Search
CPC ............. H04N 21/2407; H04N 21/231; H04N 21/233; H04N 21/23418; H04N 21/8456
See application file for complete search history.

(56) References Cited

U.S. PATENT DOCUMENTS

| | | | | |
|---|---|---|---|---|
| 10,778,354 B1 * | 9/2020 | Hegar | .............. | H04N 21/23892 |
| 2014/0237522 A1 * | 8/2014 | Rothschild | ....... | H04N 21/23805 725/88 |

| | | | | |
|---|---|---|---|---|
| 2018/0167620 A1 * | 6/2018 | Li | ........................ | H04N 19/593 |
| 2021/0144362 A1 | 5/2021 | Ichikawa | | |
| 2022/0148533 A1 | 5/2022 | Pacheco | | |
| 2023/0147407 A1 | 5/2023 | Kipp et al. | | |
| 2024/0089425 A1 | 3/2024 | Nandan et al. | | |

FOREIGN PATENT DOCUMENTS

| | | |
|---|---|---|
| EP | 4300982 A1 | 1/2024 |

OTHER PUBLICATIONS

International Search Report and Written Opinion, dated Nov. 24, 2025, for the corresponding International Application No. PCT/US2025/039532, 7 pages.

* cited by examiner

*Primary Examiner* — Gigi L Dubasky
(74) *Attorney, Agent, or Firm* — Straylight LLP

(57) ABSTRACT

System, apparatus, article of manufacture, method and/or computer program embodiments are provided for automated quality control (QC) of media content. An example method can include segmenting, via a first thread implemented by a first program at a node, a video into video segments including video and audio content; providing, via a second thread implemented by the first program, each video segment to a second program at the node; as the second thread provides each video segment to the second program, removing, from storage via a third thread implemented by the first program, one or more video segments provided to the second program by the second thread; for each video segment received by the second program, determining, via the second program, whether the video segment contains a QC issue including monophonic sound, silent/muted audio, black video frames, and/or frozen video frames; and generating QC data comprising information about QC issues detected.

20 Claims, 9 Drawing Sheets

500

Obtain, From A Recorder, A Video Segment Associated With A Video
502

Convert The Video Segment Into A Sequence Of Images
504

Determine Whether
The Video Segment Should Be
Excluded From A Quality Control Analysis Based
On The Sequence Of Images
506

Yes

No

Based On The Sequence Of Images Associated With The Video Segment, Determine Whether The Video Segment Has Video Quality Issues
508

Determine A Waveform Of An Audio Of The Video Segment
510

Based On Waveform, Determine Whether The Video Segment Has Audio Quality Issues
512

Determine Whether Text Associated With The Audio Has Quality Issues
514

Output Any Quality Issues Detected In The Video Segment
516

FIG. 5

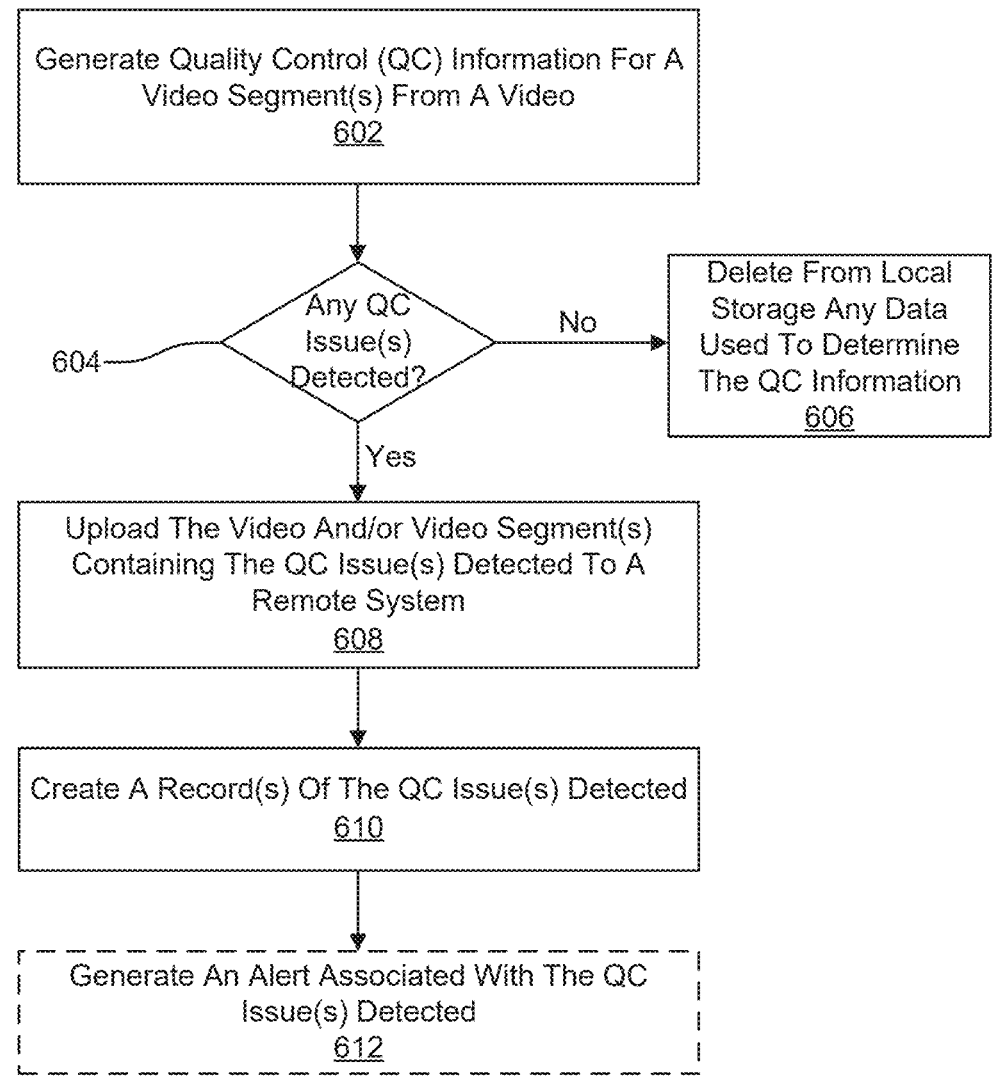

Generate Quality Control (QC) Information For A Video Segment(s) From A Video
602

Any QC Issue(s) Detected?
604

No

Delete From Local Storage Any Data Used To Determine The QC Information
606

Yes

Upload The Video And/or Video Segment(s) Containing The QC Issue(s) Detected To A Remote System
608

Create A Record(s) Of The QC Issue(s) Detected
610

Generate An Alert Associated With The QC Issue(s) Detected
612

FIG. 6

700

Segment, Via A First Thread Of Execution Implemented By A First Program Running At A Compute Node, A Video Into A Set Of Video Segments
702

Provide, Via A Second Thread Of Execution Implemented By The First Program, Each Video Segment From The Set Of Video Segments To A Second Program Running At The Compute Node
704

As The Second Thread Of Execution Implemented By The First Program Provides Each Video Segment From The Set Of Video Segments To The Second Program, Remove, From Storage Via A Third Thread Of Execution Implemented By The First Program, One Or More Video Segments Provided To The Second Program By The Second Thread Of Execution Implemented By The First Program
706

For Each Video Segment From The Set Of Video Segments Received By The Second Program, Determine, Via The Second Program, Whether That Video Segment Contains A Quality Control (QC) Issue
708

Generate QC Data Including Information About One Or More QC Issues Detected By The Second Program
710

FIG. 7

AUTOMATED QUALITY CONTROL ANALYSIS OF MEDIA CONTENT

BACKGROUND

Field

This disclosure is generally directed to detecting quality control issues on media content and, more specifically, automating a quality control analysis for media content such as live videos and video channels.

SUMMARY

Provided herein are system, apparatus, article of manufacture, method and/or computer program product embodiments (and/or combinations and/or sub-combinations thereof) for an automated quality control analysis of media content and/or channels. In some aspects, a method is provided for an automated quality control analysis of media content and/or channels. An example method can include segmenting, via a first thread of execution implemented by a first program running at a compute node, a video into a set of video segments, each video segment including video content and corresponding audio content; providing, via a second thread of execution implemented by the first program, each video segment from the set of video segments to a second program running at the compute node; as the second thread of execution implemented by the first program provides each video segment from the set of video segments to the second program, removing, from storage via a third thread of execution implemented by the first program, one or more video segments provided to the second program by the second thread of execution implemented by the first program; for each video segment from the set of video segments received by the second program, determining, via the second program, whether that video segment contains a quality control (QC) issue including monophonic sound, silent audio, black video frames, and/or frozen video frames; and generating QC data including information about one or more QC issues detected by the second program.

In some aspects, a system is provided for an automated quality control analysis of media content and/or channels. The system can include one or more computing devices such as, for example, a server, a datacenter, a cloud node, a processor, a computer, a set-top box, an Internet-of-Things (IoT) device, a peripheral device, a mobile device (e.g., a laptop computer, a tablet computer, a mobile phone or smartphone, etc.), a wearable computing device (e.g., a smartwatch, smartglasses, a head-mounted display (HMD), extended reality (e.g., virtual reality, augmented reality, mixed reality, virtual reality with video passthrough, etc.) glasses, etc.), a single-board computer (SBC) or system-on-chip (SoC) device, an edge device, and/or a smart device (e.g., a smart television, a smart appliance, etc.), among others.

The system can include memory used to store data, such as computing instructions, and one or more processors coupled to the memory and configured to perform operations including segmenting, via a first thread of execution implemented by a first program running at a compute node, a video into a set of video segments, each video segment including video content and corresponding audio content; providing, via a second thread of execution implemented by the first program, each video segment from the set of video segments to a second program running at the compute node; as the second thread of execution implemented by the first program provides each video segment from the set of video segments to the second program, removing, from storage via a third thread of execution implemented by the first program, one or more video segments provided to the second program by the second thread of execution implemented by the first program; for each video segment from the set of video segments received by the second program, determining, via the second program, whether that video segment contains a quality control (QC) issue including monophonic sound, silent audio, black video frames, and/or frozen video frames; and generating QC data including information about one or more QC issues detected by the second program.

In some aspects, a non-transitory computer-readable medium is provided for an automated quality control analysis of media content and/or channels. In some cases, the non-transitory computer-readable medium can have instructions stored thereon that, when executed by one or more processors, cause the one or more processors to perform operations including segmenting, via a first thread of execution implemented by a first program running at a compute node, a video into a set of video segments, each video segment including video content and corresponding audio content; providing, via a second thread of execution implemented by the first program, each video segment from the set of video segments to a second program running at the compute node; as the second thread of execution implemented by the first program provides each video segment from the set of video segments to the second program, removing, from storage via a third thread of execution implemented by the first program, one or more video segments provided to the second program by the second thread of execution implemented by the first program; for each video segment from the set of video segments received by the second program, determining, via the second program, whether that video segment contains a quality control (QC) issue including monophonic sound, silent audio, black video frames, and/or frozen video frames; and generating QC data including information about one or more QC issues detected by the second program.

BRIEF DESCRIPTION OF THE FIGURES

The accompanying drawings are incorporated herein and form a part of the specification.

FIG. 5 is a flowchart illustrating an example process for detecting quality control issues associated with a media content item, according to some examples of the present disclosure.

FIG. 6 is a flowchart illustrating an example process for processing quality control information and related content associated with a video segment from a video, according to some examples of the present disclosure.

FIG. 7 is a flowchart illustrating an example process for performing automated quality control of media content, according to some examples of the present disclosure.

In the drawings, like reference numbers generally indicate identical or similar elements. Additionally, generally, the left-most digit(s) of a reference number identifies the drawing in which the reference number first appears.

DETAILED DESCRIPTION

Figure 1A:
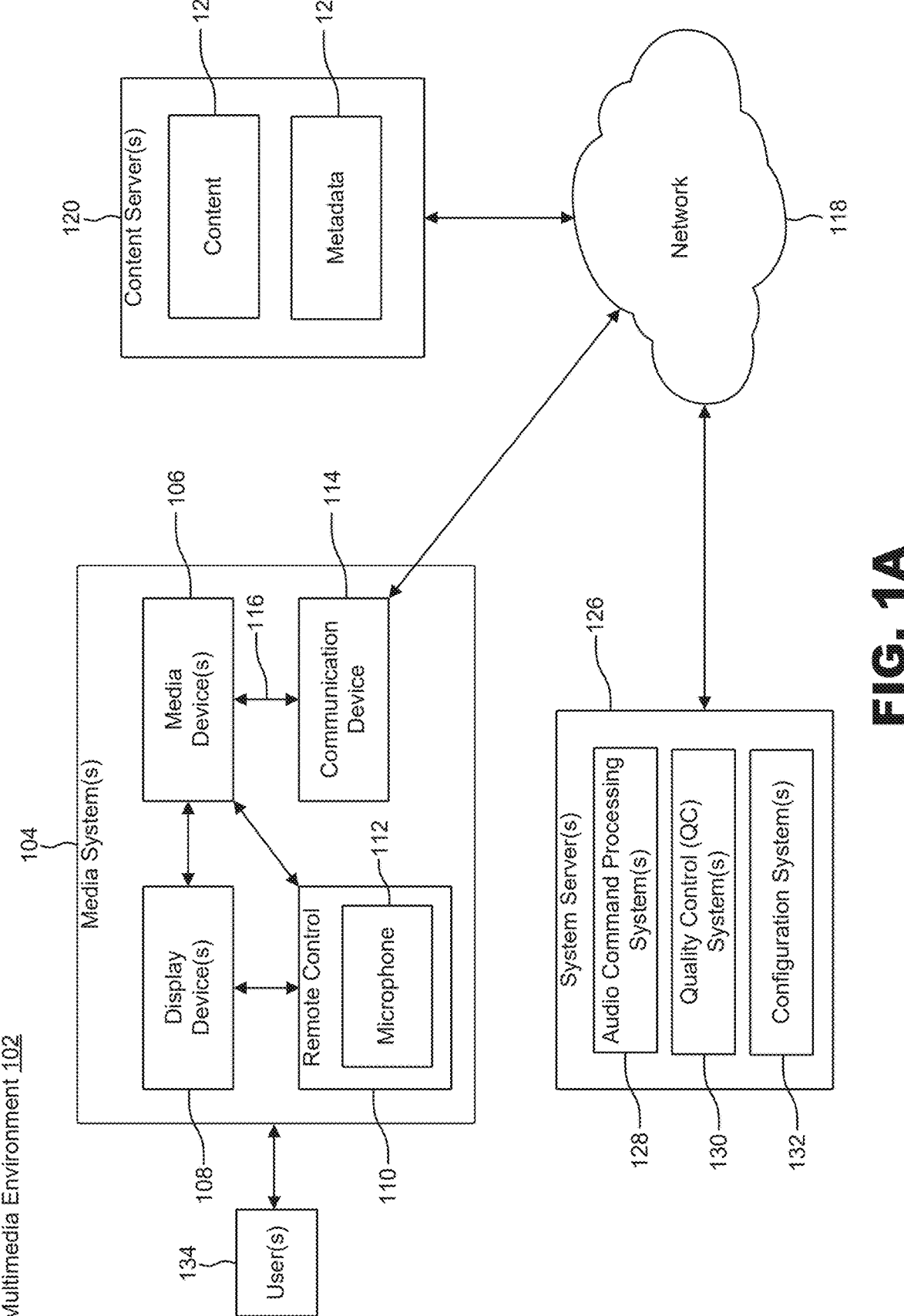
FIG. 1A is a block diagram illustrating an example multimedia environment, according to some examples of the present disclosure.

Users can access and consume media content using client devices such as, for example and without limitation, mobile phones (e.g., smartphones), set-top boxes, computers (e.g., desktop computers, laptop computers, tablet computers, etc.), televisions (TVs), IPTV receivers, media devices, monitors, projectors, video game consoles, smart wearable devices (e.g., smartwatches, smartglasses, head-mounted displays (HMDs), extended reality devices (e.g., virtual reality glasses, augmented reality glasses, mixed reality glasses, virtual reality devices with video passthrough, etc.), single-board computers (SBCs) or system-on-chip (SoC) devices, and Internet-of-Things (IoT) devices, among other devices. The media content can include or encompass digital formats and/or assets such as, for example and without limitation, videos (e.g., live videos, pre-recorded or on-demand videos, streamed videos, TV shows, movies, animated videos, motion graphics videos, live action recordings, video clips, any sequence of video frames or graphics, etc.), video games, audio, text (e.g., closed captions, subtitles, and/or any other text content), graphics, video channels, and/or images, among other types.

For example, a user can use a client device to watch a video from a media content platform, such as a media content platform associated with a streaming service, a media content platform associated with an online content delivery network, a media player application, an online video sharing application, a web browser, etc. The video can include a live or on-demand video, such as a movie, a TV show, an animated video, a video broadcast, a video game, a video conference, etc. The media content platform can stream or access the video from storage, and display the video for the user on a screen of the client device and/or a separate/external display. The user may also use the media content platform to manage settings of the video (e.g., a volume, closed caption and/or subtitle settings, a resolution of the video, etc.), control a playback of the video, and/or access other media content. In many cases, the media content platform used to access media content can include a large volume of media content items, such as live and/or on-demand videos, which may be available to users from the media content platform and/or various media channels on the media content platform.

A media content platform and/or service can have available a large amount of media content items and/or media channels. With such a large amount of media content items and/or media channels, it can be very difficult to check all media content and/or media channels for potential quality issues such as errors, video quality issues, audio quality issues, quality issues with audio-related text data (e.g., subtitles, closed captions, etc.), and/or any other quality issues. For example, a manual quality control process can be implemented to detect quality issues with media content and/or channels at the media content platform. The manual quality control process can involve a number of quality control users watching media content and channels available at the media content platform to painstakingly check the media content and channels for quality issues. However, such a manual quality control process is inefficient, unscalable, expensive, and very difficult to implement. Indeed, depending on the amount of media content and channels available at the media content platform, it may be impossible to manually check all of the media content and channels for potential quality issues. Moreover, it may be unfeasible or unpractical to implement such a manual quality control process for round-the-clock monitoring of content and channels, such as live content and channels. In many cases, it may also be difficult or impossible to determine whether a quality issue detected at a destination device can be attributed to the media content item or channel associated with the quality issue, or another cause such as a network issue, a device issue, a software issue, etc., even if the quality issue is detected programmatically using a quality control application.

Consequently, a number of quality issues with the media content and channels at a media content platform may go undetected by a quality control process (e.g., a quality control system or user) for an undesirably long period of time (or indefinitely). In many cases, such quality issues may not be corrected before (or even after) such media content and channels are accessed by users of the media content platform, which can negatively affect the viewing experience of such users and the users' perceptions of the provider(s) and/or service(s) associated with the media content platform. As a result, users may be displeased with the quality of the media content and channels at the media content platform. Such user displeasure may even reflect poorly on a provider(s) and/or service(s) associated with the media content platform, the media content, and/or the media channels, thus affecting the reputation and brand of such provider(s) and/or service(s).

Provided herein are system, apparatus, device, method (also referred to as a process) and/or computer program product embodiments, combinations and/or sub-combinations thereof (also referred to as "systems and techniques" hereinafter) for automating a quality control analysis of media content and/or channels. The systems and techniques described herein can programmatically perform a quality control analysis of media content and/or channels as needed or on an ongoing basis to ensure that all media content and/or channels are checked for quality issues. This can allow any quality control issues in any media content and/or channels to be detected and corrected promptly. Moreover, the systems and techniques described herein provide a scalable quality control framework that can efficiently, accurately, and automatically monitor and detect quality issues on any media content and/or channels, including live content and/or channels.

In some examples, the systems and techniques can use multithreading and/or parallel computing to perform quality control tasks concurrently (or at least partially concurrently), which can increase and/or improve the performance, efficiency, speed, and/or operation of the quality control process. For example, a cloud node serving as a master node can orchestrate the quality control analysis performed by various worker cloud nodes to check for quality issues on different media content and/or channels. The master node can instantiate/spawn worker cloud nodes as needed to perform the quality control analysis of different media content and/or channels, and can terminate/uninstantiate any worker cloud nodes that are not needed for the quality control analysis or have completed their respective quality control analysis tasks. The master node can assign media content and/or channels to analyze to different worker cloud nodes in order to coordinate which worker cloud nodes check which media content and/or channels. When a worker cloud node is assigned a media content item and/or channel to check for quality issues, the worker cloud node can use multithreading to perform quality control tasks in parallel (or at least partially concurrently) in order to increase or improve a performance, efficiency, and/or speed of the worker cloud node.

In some examples, the worker cloud node can implement a software container or a virtual machine, which the worker cloud node can use to perform the quality control analysis on the media content and/or channels assigned to that worker cloud node. In some cases, the worker cloud node can receive a video (or any other media content and/or channel) assigned to the worker cloud node by the master node for quality control analysis. The worker cloud node can use a first thread of execution of a first program implemented by the worker cloud node to segment the video into video segments for processing. The first thread of execution can save each video segment in a local storage. The worker cloud node can concurrently use a second thread of execution of the first program to monitor the video segments in the local storage and identify any video segment that is available and ready for quality control analysis.

As the second thread of execution identifies a video segment available and ready for quality control analysis, the second thread of execution can provide that video segment to a second program implemented by the worker cloud node for the quality control analysis. When a video segment has been provided to and/or processed by the second program, a third thread of execution of the first program can concurrently remove that video segment from the local storage to increase the local storage space available to store other data, such as other video segments, and prevent the local storage from running out of space as more video segments are added to the local storage.

The second program can receive the video segment from the second thread of execution of the first program, and check the video segment for any quality control issues. The second program can check the video segment for any quality control issues such as, for example and without limitation, frozen video frames, black video frames, audio issues (e.g., silent/muted audio or missing sound, missing audio channel (e.g., monophonic sound), corrupt sound, volume issues, noise, etc.), errors in audio-related text data (e.g., closed captions, subtitles, etc.) associated with the video segment, unsynchronized media content (e.g., out-of-sync media signals; mismatched video, audio, and/or audio-related text data; out-of-sync video, audio, and/or audio-related text data, etc.), video and/or audio distortions, image/video ghosting, aliasing, screen tearing, video flicker, jitter, stuck and/or dead pixels, cropped images, interlacing issues, loss of picture information and/or details, macroblocking, pixelation, image/video blur, choppy and/or jerky video playback, and/or any other QC issues.

In some cases, to detect video quality issues, the second program can convert the video segment into images, and check the images for motion to determine whether the images correspond to or represent frozen frames (e.g., if two or more sequential images have no motion, are the same, or have less than a threshold amount of motion). The second program can additionally or alternatively check the pixels of the images to determine whether the images correspond to or represent black video frames. For example, the second program can check the images for pixel values representing the color black or pixel values representing a range of intensities of the color black. If an image has a certain amount or ratio of pixel values representing the color black or representing the range of intensities of the color black, the second program can determine that such image corresponds to or represents a black video frame. In some cases, if the second program determines that a threshold number of images corresponds to or represents black video frames or a duration of a video portion represented by such images corresponding to or representing black video frames, the second program can determine that the video segment contains a video quality issue, which in this example refers to black video frames.

In some aspects, to detect audio quality issues, the second program can identify the waveform of any audio signal and/or channel associated with the video segment, and use the waveform of each audio signal and/or channel to determine whether the video segment contains audio quality issues. For example, if the waveform of an audio signal or channel is flat, has less than a threshold energy, has less than a threshold amplitude, and/or has less than a threshold frequence, the second program can determine that the audio associated with that waveform is silent or muted audio. The second program can then determine that the video segment contains an audio quality issue, which in this example refers to silent or muted audio.

As another example, if the second program identifies a first waveform associated with a first audio channel and a second waveform associated with a second audio channel, the second program can compare the first waveform and the second waveform to determine whether the first audio channel or the second audio channel is missing or silent. For example, if the first waveform is flat or flatter relative to the second waveform, the second program can determine that the first audio channel associated with the first waveform is missing or silent. As another example, if the energy, amplitude, and/or frequency of the audio wave in the first waveform is a threshold amount lower than the energy, amplitude, and/or frequency of the audio wave in the second waveform, the second program can determine that the first audio channel is missing or silent. The second program can then determine that the video segment contains an audio quality issue, which in this example refers to monophonic sound (e.g., a missing or silent audio channel).

In some cases, the second program can compare the audio associated with the video segment with video content or images derived from the video segment to determine whether the video segment has any audio-video synchronization errors. For example, the second program can compare the audio with corresponding video content or images from the video segment to determine whether the audio and the video content or images are out-of-synchronization (also referred to as out-of-sync).

In some cases, to determine whether audio-related text data, which as used herein refers to text generated from an audio of the video segment (e.g., closed captions generated from the audio, subtitles generated from the audio, etc.), contains quality control issues, the second program can analyze the audio-related text data for any grammatical errors, translation errors (e.g., if the audio-related text data includes subtitles) such as mistranslations or incorrect language translations, transcribing errors (e.g., if the audio-related text data includes closed captions), synchronization errors such as the audio-related text data being out-of-sync with an audio content of the video segment and/or a video content of the video segment.

The second program can detect any other quality control issues, as further described herein. Upon detecting one or more quality control issues, the second program can generate one or more records containing information about the one or more quality control issues. The one or more records can be used to identify the one or more QC issues and associated video segments, determine whether to correct the one or more QC issues, determine whether to remove the video containing the video segment with the one or more QC issues from a channel and/or content platform, determine what to do about the one or more QC issues and/or how to respond to the one or more QC issues, determine how to fix the one or more QC issues, track the one or more QC issues, and/or determine any other actions associated with the one or more QC issues.

In some examples, the record associated with a quality control (QC) issue can include information identifying and/or describing the video segment that contains the QC issue, identifying and/or describing the QC issue, identifying a timestamp corresponding to a start time within the video segment where the QC issue begins, identifying a timestamp corresponding to an end time within the video segment where the QC issue ends, identifying the location of the video segment within the overall video, identifying a channel name or identifier associated with the video segment, including a record identifier, including a copy of the video and/or the video segment, including metadata associated with the video and/or the video segment, identifying a status of the QC issue, including a copy of any media assets used to detect the QC issue (e.g., images, audio, video frames, audio-related text, etc.), identifying a reason or cause associated with the QC issue, identifying a type of content associated with the video segment, identifying a type of channel associated with the video segment, indicating a suggested or proposed solution to the QC issue, flagging the QC issue, identifying an action item associated with the QC issue, including an alert generated for the QC issue, identifying a feedback status associated with the QC issue, and/or including any other relevant information.

Figure 1B:
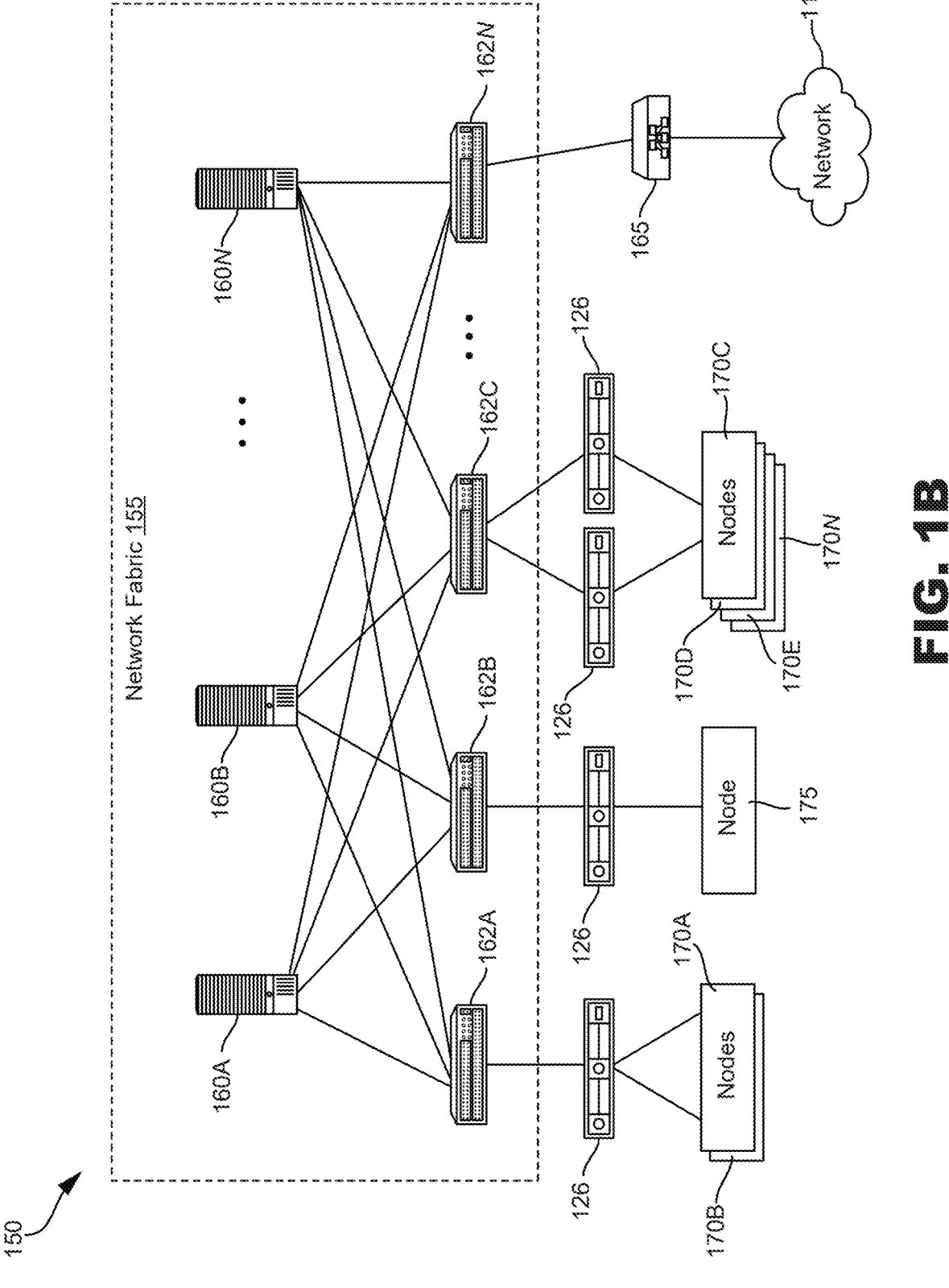
FIG. 1B is a block diagram illustrating an example architecture of a cloud network, according to some examples of the present disclosure.

Various embodiments and aspects of this disclosure may be implemented using, and/or may be part of, multimedia environment 102 shown in FIG. 1A and/or network architecture 150 shown in FIG. 1B. It is noted, however, that the multimedia environment 102 and the network architecture 150 are provided for illustrative purposes and are not limiting. Examples and embodiments of this disclosure may be implemented using, and/or may be part of, environments that are different from and/or in addition to the multimedia environment 102 and/or network architectures that are different from and/or in addition to the network architecture 150, as will be appreciated by persons skilled in the relevant art(s) based on the teachings contained herein. An example of the multimedia environment 102 and network architecture 150 shall now be described.

Example Multimedia Environment And Network Architecture

FIG. 1A illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include a media system(s) 104. The media system(s) 104 can include one or more media systems. A media system can include and/or represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. The user(s) 134 (e.g., any user) may interact with the media system(s) 104 to select and consume content.

The media system(s) 104 can include a media device(s) 106 coupled to a display device(s) 108. The media device(s) 106 can include one or more media devices and the display device(s) 108 can include one or more display devices. Moreover, each media system (e.g., each media system from the media system(s) 104) may include one or more media devices (e.g., one or more media devices from the media device(s) 106), and each media device can be coupled to one or more display devices (e.g., one or more display devices from the display device(s) 108). It is noted that terms such as "coupled," "connected to," "attached," "linked," "combined" and similar terms may refer to physical, electrical, magnetic, logical, etc., connections, unless otherwise specified herein.

The media device(s) 106 (e.g., each media device) may be or include a streaming media device, DVD or BLU-RAY device, audio/video playback device, cable box, and/or digital video recording device, to name just a few examples. Display device(s) 108 may include or be part of a monitor, television (TV), desktop computer, laptop computer, mobile phone (e.g., smartphone), tablet computer, wearable device (e.g., a smartwatch, an HMD, smartglasses, etc.), screen, appliance, internet-of-things (IoT) device, SBC or SoC, and/or projector, to name just a few examples. In some examples, the media device(s) 106 can be a part of, integrated with, operatively coupled to, and/or connected to the display device(s) 108. For example, each media device can be part of, integrated with, operatively coupled to, and/or connected to one or more respective display devices.

The media device(s) 106 (e.g., each media device) may be configured to communicate with network 118 via a respective communication device 114. The communication device 114 may include, for example, a cable modem or satellite TV transceiver. The media device(s) 106 (e.g., each media device) may communicate with the communication device 114 over a link 116. In some examples, the link 116 may include wireless (such as WiFi) and/or wired connections.

In various examples, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system(s) 104 may include a remote control 110. The remote control 110 can be any component, part, apparatus and/or method for controlling the media device(s) 106 and/or display device(s) 108, such as a remote control, a tablet, laptop computer, mobile phone (e.g., smartphone), wearable, on-screen controls, integrated control buttons, audio controls, or any combination thereof, to name just a few examples. In some examples, the remote control 110 wirelessly communicates with the media device(s) 106 and/or display device(s) 108 using cellular, Bluetooth, infrared, near-field communication, any other communication technology, or a combination thereof. The remote control 110 may include a microphone 112, which is further described below.

The multimedia environment 102 may include content servers 120 (also called content providers, channels or sources). Although only one content server is shown in FIG. 1A, in practice, the multimedia environment 102 may include any number of content servers. Each of the content servers 120 may be configured to communicate with network 118.

Each of the content servers 120 may store content 122 and metadata 124. Content 122 may include any combination of music, videos, movies, TV programs, multimedia, images, still pictures, text, graphics, gaming applications, advertisements, programming content, public service content, government content, local community content, targeted media content, software, and/or any other content or data objects in electronic form.

In some examples, metadata 124 can include data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include system servers 126. The system servers 126 may operate to support the media device(s) 106 from the cloud and/or any other network. It is noted that the structural and functional aspects of the system servers 126 may wholly or partially exist in the same or different ones of the system servers 126.

In some examples, the system servers 126 may include, host, operate, and/or implement an audio command processing system(s) 128, a quality control (QC) system(s) 130, and a configuration system(s) 132. The audio command processing system(s) 128 can process audio data as described herein. For example, as noted above, the remote control 110 may include a microphone 112 that can receive audio data from user(s) 134 (as well as other sources, such as the display device(s) 108). In some examples, the media device(s) 106 may be audio responsive, and the audio data may represent verbal commands from the user(s) 134 to control the media device(s) 106 as well as other components in the media system(s) 104, such as the display device(s) 108.

In some examples, the audio data received by the microphone 112 in the remote control 110 can be transferred to the media device(s) 106, which can then be forwarded to the audio command processing system(s) 128 for processing. The audio command processing system(s) 128 may operate to process and analyze the received audio data to recognize the verbal commands of the user(s) 134. The audio command processing system(s) 128 may forward the verbal commands back to the media device(s) 106 for processing.

Figure 2:
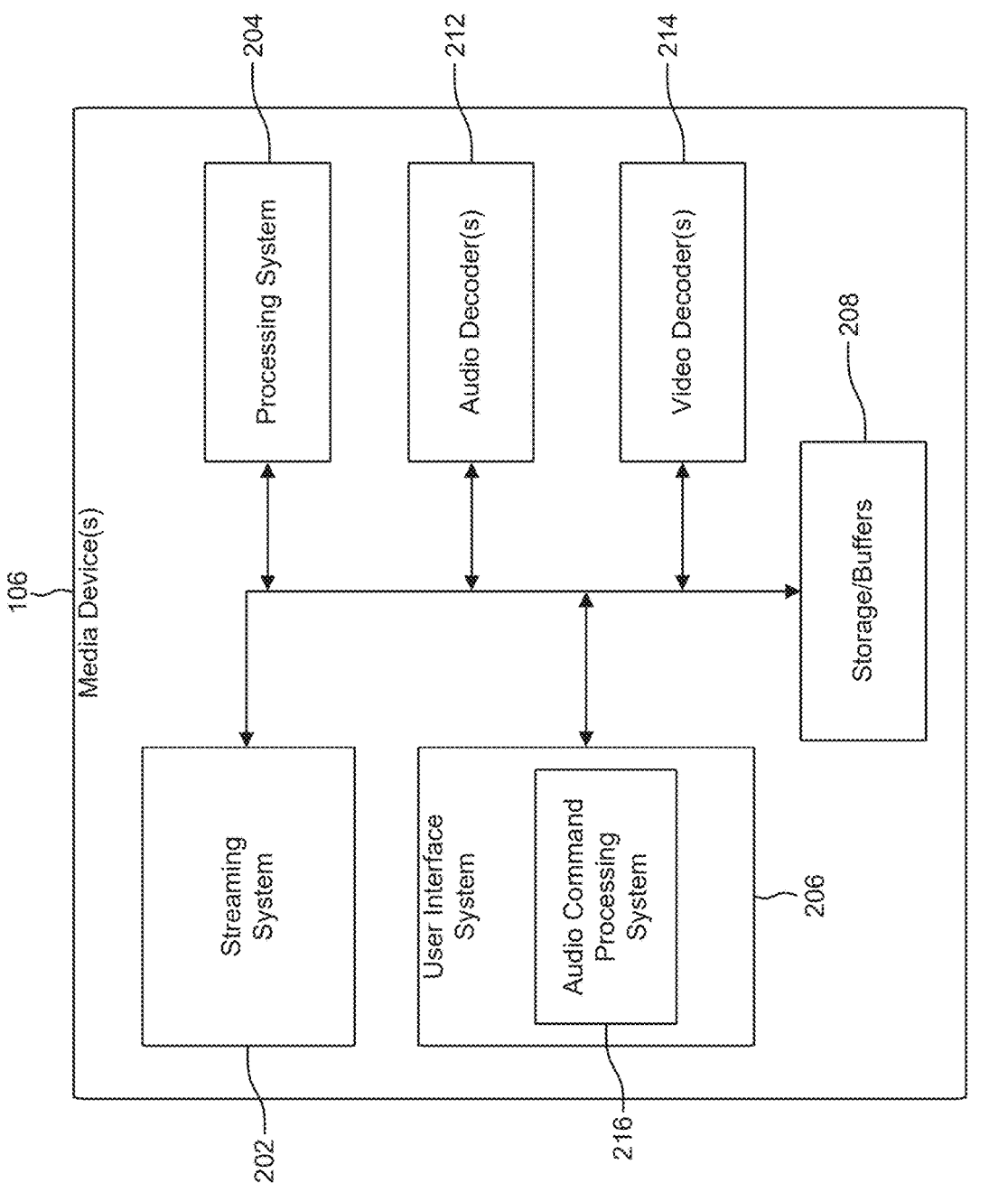
FIG. 2 is a block diagram illustrating an example streaming media device, according to some examples of the present disclosure.

In some examples, the audio data may be alternatively or additionally processed and analyzed by an audio command processing system 216 in the media device(s) 106 (see FIG. 2). The media device(s) 106 and the system servers 126 may cooperate to pick any of the verbal commands to process (either the verbal command recognized by the audio command processing system(s) 128 in the system servers 126, or the verbal command recognized by the respective audio command processing system 216 in the media device(s) 106).

The QC system(s) 130 and the configuration system(s) 132 can each include, be part of, be implemented by, and/or represent one or more computing systems such as, for example and without limitation, one or more server computers, datacenters, virtual or logical systems (e.g., virtual machines (VMs), software containers, etc.), network nodes, software and/or hardware compute resources, computing devices (e.g., laptop computers, desktop computers, tablet computers, networking devices such as switches and controllers, smart and/or IoT devices, etc.), hardware compute resources (e.g., processors, memory, etc.), integrated circuits or computer chips (e.g., SoCs, SBCs, field-programmable gate arrays (FPGAs), application-specific integrated circuits, etc.), cloud-based resources (e.g., cloud-based hardware resources and/or cloud-based software resources such as cloud-based applications), and/or any other software and/or hardware computing system(s).

In some cases, the QC system(s) 130 can include, host, implement, and/or represent one or more software and/or hardware nodes, computer workloads, software models, virtual servers, cloud nodes, and/or algorithms such as, for example and without limitation, an artificial intelligence (AI) or machine learning (ML) model, a data processing and/or preprocessing model/algorithm, a computer vision and/or image processing algorithm, an audio processing algorithm, a neural network, etc. For example, the QC system(s) 130 can include, host, implement, and/or represent cloud instances/nodes and/or workloads instantiated on a network environment, such as the network architecture 150 shown in FIG. 1B. To illustrate, the QC system(s) 130 can include, host, implement, and/or represent the nodes 170A-N (collectively referred to as "nodes 170" or "worker nodes 170" herein) and the node 175 (also referred to as "master node 175" herein) shown in FIG. 1B.

Figure 3:
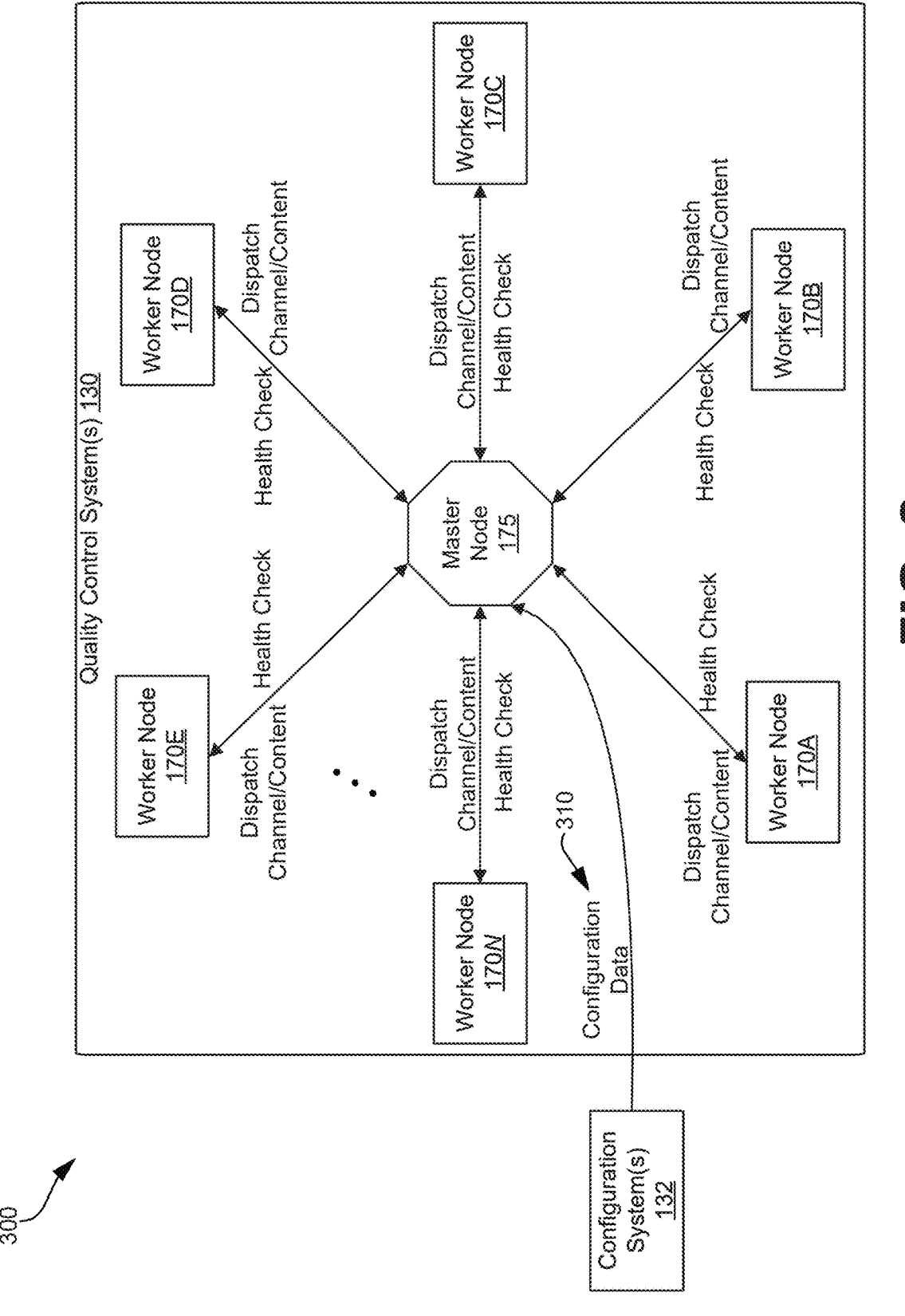
FIG. 3 is a block diagram illustrating an example architecture of an example quality control system for detecting quality control issues associated with media content items, according to some examples of the present disclosure.

The QC system(s) 130 can identify media content and/or channels that the QC system(s) 130 should check for potential quality issues, as further described herein, and can orchestrate and/or schedule the quality control checks of such media content and/or channels by designated components and/or nodes, such as the worker nodes 170 shown in FIG. 3. The QC system(s) 130 can process content (e.g., media assets and/or signals), such as video content, audio content, and/or text content, to check such content for potential quality issues. The QC system(s) 130 can continuously and/or programmatically check any or all media content items and/or channels available in the multimedia environment 102 for potential QC issues such as errors, frozen screens or video frames, black screens or video frames, silent/muted audio, missing audio, missing audio channel (e.g., monophonic sound), errors in audio-related text data (e.g., closed captions, subtitles, etc.), media synchronization issues (e.g., unsynchronized or out-of-sync video, audio, and/or audio-related text data), playback issues, video quality issues, audio quality issues, pixelation, macroblocking, audio and/or video distortions, aliasing, interlacing issues, screen tearing, noise, jitter, video/image blur, stuck or dead pixels, cropped images, aliasing, video flicker, image/video ghosting, interlacing issues, loss of picture information and/or details, choppy or jerky video playback, metadata errors, and/or any other QC issues. The QC system(s) 130 can create records identifying any quality issues detected so that such issues are known and can be corrected or addressed as needed. In some cases, the QC system(s) 130 can generate alerts when it detects quality issues (or certain types of quality issues), which can be used to notify other systems and/or users of such issues.

In some examples, the QC system(s) 130 can determine which media content and/or channels to check for quality issues based on information configured on and provided by the configuration system(s) 132, such as a list of media content items and/or channels designated for quality control review, associated media content and/or channel identifiers, media content and/or channel metadata, quality control preferences/settings, quality control exclusions (e.g., content/channels that may be exempt from quality control review), quality control parameters, etc. For example, in some cases, a user can configure the quality control process via the configuration system(s) 132, which the configuration system(s) 132 can use to determine what information and/or instructions to provide the QC system(s) 130 for use in performing and/or initiating the quality control process. To illustrate, the configuration system(s) 132 may include a list of media content items and/or channels that should be checked by the QC system(s) 130 for any quality issues, and any other relevant data that the QC system(s) 130 can use when performing such check, such as metadata associated with the media content items and/or channels, quality control parameters, etc. In some cases, a user can configure any or all of such information at the configuration system(s) 132, which can then provide relevant information to the QC system(s) 130.

In some aspects, the configuration system(s) 132 can provide a user interface (UI) that a user can use to provide any information for the quality control check, such as the list of media content items and/or channels to be checked, content and/or channel information, quality control settings and/or parameters, quality control instructions, quality control management information, quality control triggers and/or thresholds, quality control exclusions/exceptions (and/or keywords used to identify excluded/exempted content and/or channels), quality control schedules, quality control issues to check, quality control operations, and/or any other information. In some examples, the configuration system(s) 132 can use an interface, such as an application programming interface (API), to communicate with the QC system(s) 130. For example, the configuration system(s) 132 can use an API to provide quality control information to the QC system(s) 130, such as a list of media content items and/or channels to check for quality issues, quality control exceptions/exemptions, quality control settings/parameters, metadata, and/or any other data.

In some cases, one or more aspects, components, devices, nodes, systems, instances, and/or portions of the example multimedia environment 102 (and/or copies/instances thereof) shown in FIG. 1A can be implemented by and/or in a cloud network or datacenter. For example, any portion (or all) of the network 118, any of the content servers 120 (or all), and/or any of the system servers 126 (or all) can be implemented by and/or in a cloud network or datacenter. In other cases, one or more aspects, components, devices, nodes, systems, instances, and/or portions of the example multimedia environment 102 (and/or copies/instances thereof) shown in FIG. 1A can additionally or alternatively be implemented by and/or in any other network or datacenter, such as an on-premises datacenter, any type of campus network, any type of enterprise network, and/or any other type of network and/or datacenter. An example network architecture that can be used to implement any such network or datacenter (or any portion thereof), such as a cloud network/datacenter or an on-premises network/datacenter, is shown in FIG. 1B and further described below.

FIG. 1B is a block diagram illustrating an example network architecture 150 that can be used to implement one or more aspects, components, devices, nodes, systems, instances, and/or portions of the example multimedia environment 102 (and/or any other multimedia environment), according to some examples of the present disclosure. The example network architecture 150 in FIG. 1B can represent, implement, deploy, host, support, include and/or provide the infrastructure for (or a portion of the infrastructure for) a datacenter (e.g., a cloud datacenter, an on-premises datacenter, a hybrid datacenter including private and public datacenters or datacenter portions, etc.), a network infrastructure, and/or any network environment (or portion thereof) such as, for example and without limitation, a cloud network/environment, a campus network/environment, an enterprise network/environment, an on-premises network/environment, a private network/environment, a public network/environment, a hybrid network/environment (e.g., a network/environment including both private and public networks/environments or portions thereof), and/or the like.

In some examples, the example network architecture 150 can host, implement, deploy, provide (e.g., provide the infrastructure for or a portion of the infrastructure for), support, and/or run/execute one or more applications, virtual machines (VMs), software containers, software tools, software functions, software algorithms, software models (e.g., artificial intelligence and machine learning models, software models implementing one or more classical algorithms, etc.), software applications, software packages, domains, databases, networks, services, workloads, service chains, functions, controllers, virtual network functions (VNFs), servers, drivers, hardware and/or software resources, software and/or hardware devices, software and/or hardware nodes, networking elements, serverless environments, serverless functions, cloud services and/or applications (e.g., software-as-a-service, function-as-a-service, infrastructure-as-a-service, platform-as-a-service, cloud applications, and/or any other cloud services and/or applications), execution environments, storage systems, processing/compute systems, memory systems, software and/or network sites, software policies, virtual/logical networks, overlay networks, software-defined networks (SDNs), interfaces, and/or any other code, component, element, application, service, etc.

For example, the network architecture 150 can include, represent, implement, support, run, host, and/or provide the infrastructure for (or a portion of the infrastructure for) a datacenter, network (e.g., a cloud or cloud network, an on-premises network, a private network, a public network, a hybrid network, etc.), network infrastructure, and/or network environment used to host, implement, support, deploy, provide, and/or run quality control workloads/nodes, such as the worker nodes and the master node shown in FIG. 3 (and further described below). In such examples, the master node and each of the worker nodes can implement, include, represent, support, run, host, and/or provide one or more software applications/services, software systems, software packages, software modules, software units, software tools, interfaces, software/application code, functions, virtual environments, virtual applications, execution environments, virtualization elements (e.g., operating system-level virtualization elements, application-level virtualization elements, etc.), platforms, and/or any other components. In some cases, the master node and/or one or more of the worker nodes (or all) can each host and run one or more software containers, VMs, VNFs, applications (e.g., container applications, VM applications, and/or any other software applications), operating systems (OSs), functions, tools, and/or any other execution environment, code, tool, component, element, and/or package. For example, each of the worker nodes can host, implement, include, run/execute and/or provide infrastructure for the recorder 405 and the detector 440 shown in FIG. 4.

As shown in FIG. 1B, the network architecture 150 can include a network fabric 155. The network fabric 155 can include and/or represent the physical layer (e.g., underlay)

and/or infrastructure of the network architecture 150. In some cases, the network fabric 155 can represent a data center(s) of one or more networks such as, for example, one or more cloud networks. The network fabric 155 can include network devices 160A-N (collectively referred to as "network devices 160" hereinafter) and network devices 162A-N (collectively referred to as "network devices 162" hereinafter), which are interconnected to route, relay, forward, and/or switch traffic in the network fabric 155. In some examples, the network devices 160 and the network devices 162 can include, implement, represent, and/or operate as switches (e.g., Layer 2 and/or Layer 3 switches, aggregation switches, ingress and/or egress switches, top-of-rack (ToR) switches, core switches, spine switches, leaf switches, etc.), routers, hubs, bridges, gateways, provider edge devices, firewalls, network controllers, and/or any other type of networking devices. In FIG. 1B, the network fabric 155 includes or implements a spine-leaf topology. In such examples, the network devices 160 can represent spine nodes (e.g., spine switches or routers) and the network devices 162 can represent leaf nodes (e.g., leaf switches or routers). In other examples, the network fabric 155 can alternatively or additionally include or implement any other network topology.

The network devices 160 are interconnected with the network devices 162, and the network devices 162 can connect the network 118, the system servers 126 (e.g., including QC system(s) 130 and configuration system(s) 132), the network device 165, the nodes 170, and/or the node 175 with any portion of the network fabric 155 (e.g., including each other), the media device(s) 106, the content servers 120, an external network(s), a network overlay(s), a logical network(s), a network portion(s) or branch/branches, an external device(s), a service chain(s), a data center(s), a cloud network(s), and/or any other network(s) and/or compute/network element(s). In some cases, the network fabric 155 can include, host, and/or implement a network overlay (s) or logical network(s) that includes or implements one or more application services, servers, VMs, software containers, virtual resources (e.g., storage, memory, processors, network interfaces, virtual tools, execution environments, etc.), workloads, functions, virtual networks, hardware and/or software resources, and/or any other element(s).

Network connectivity in the network fabric 155 can flow from the network devices 160 to the network devices 162, and vice versa. The network devices 162 can route, switch, relay, forward, and/or bridge network traffic to and from other portions of the network fabric 155, other networks, and various network elements such as the media device(s) 106 shown in FIG. 1A, the network 118, the content servers 120 shown in FIG. 1A, the system servers 126, the network device 165, the nodes 170, the node 175, external client devices (e.g., clients devices external to the network fabric 155), data centers, clouds, tunnels, software-defined networks (SDNs) and/or SDN branches, on-premises networks, cloud tenants, cloud customers, applications, and/or any other network element. Thus, the network devices 162 can connect networks and network elements of the network fabric 155 with each other and with other networks and network elements.

In FIG. 1B, the system servers 126 can include or represent computer servers. Each of the system servers 126 can host, include, implement, and/or run one or more applications, functions, services, VMs, software containers, service chains, workloads, AI/ML models, algorithms, resources, cloud appliances, and/or any other software. For instance, in some cases, one or more of the system servers 126 can host, represent, implement, run, and/or include the content servers 120, the audio command processing system(s) 128, the QC system(s) 130, and/or the configuration system(s) 132 shown in FIG. 1A. In some cases, the system servers 126 connected to the network devices 162 can encapsulate and decapsulate packets to and from the network devices 162. For example, the system servers 126 can include, host, implement and/or operate one or more virtual routers, switches, gateways, endpoints, and/or network devices for tunneling packets between an overlay or logical layer hosted by, or connected to, the system servers 126 and an underlay layer represented by or included in the network fabric 155.

As shown in FIG. 1B, the system servers 126 can host, include, run, operate, and/or implement the nodes 170 and the node 175. In some examples, the nodes 170 and the node 175 can represent cloud instances. For example, in some cases, the nodes 170 and the node 175 can each represent a virtual server and/or environment (e.g., a VM, a software container, etc.) that uses compute, memory, storage, and/or networking resources on the cloud (e.g., network architecture 150) for respective workloads. In some aspects, the nodes 170 and/or the node 175 can perform parallel computing using, for example, multithreading. Moreover, the nodes 170 can represent the worker nodes shown in FIG. 3, and the node 175 can represent the master node shown in FIG. 3. Each of the nodes 170 and/or the node 175 can include, host, implement, run, operate, and/or represent one or more server applications, software containers, VMs, software, services, AI/ML models, algorithms, cloud appliances, software functions, service chains, workloads, server-side functions, processing resources, computers, and/or any other software and/or hardware component.

For example, in some cases, each of the nodes 170 and/or the node 175 can represent a node instance that includes, implements, hosts, and/or runs a software container(s). The software container associated with a node can provide, run, deploy, include, operate, represent, and/or implement an execution environment(s), a workload(s), an application(s), software, an AI/ML model(s), an algorithm(s), a driver(s), a computer service(s), a software model(s) and/or algorithm (s), a function(s), a software library/libraries, a software tool(s), a software/cloud appliance(s), a software component (s), and/or any other computing element(s). In some cases, the nodes 170 and the node 175 can represent cloud node instances running respective computing environments, such as software containers or VMs. In some aspects, the nodes 170 and/or the node 175 can run software containers and implement multithreading. Moreover, each of the nodes 170 can additionally host, implement, and/or include the recorder 405 and/or the detector 440 shown in FIG. 4.

In some cases, one or more of the system servers 126, the nodes 170, and/or the node 175 can host, represent, implement, operate, and/or include the QC system(s) 130 and/or the configuration system(s) 132 shown in FIG. 1A. In some examples, one or more of the system servers 126 can host, represent, implement, and/or include the QC system(s) 130 and/or the configuration system(s) 132 shown in FIG. 1A, and one or more of the system servers 126 (e.g., which can include any of the one or more servers associated with the QC system(s) 130 and/or the configuration system(s) 132 and/or one or more additional/different servers from the system servers 126) can host, implement, include, operate, and/or run the nodes 170 and the node 175. In some aspects, the node 175 and/or one or more of the nodes 170 can each include, represent, host, operate, and/or implement one or more VMs. Each VM can include software, services, drivers, applications, libraries, functions, virtualized resources (e.g., processors, memory, storage, network interfaces, etc.), and/ or workloads installed, implemented, included, and/or running/executed on a guest operating system (OS) associated with the VM.

Figure 4:
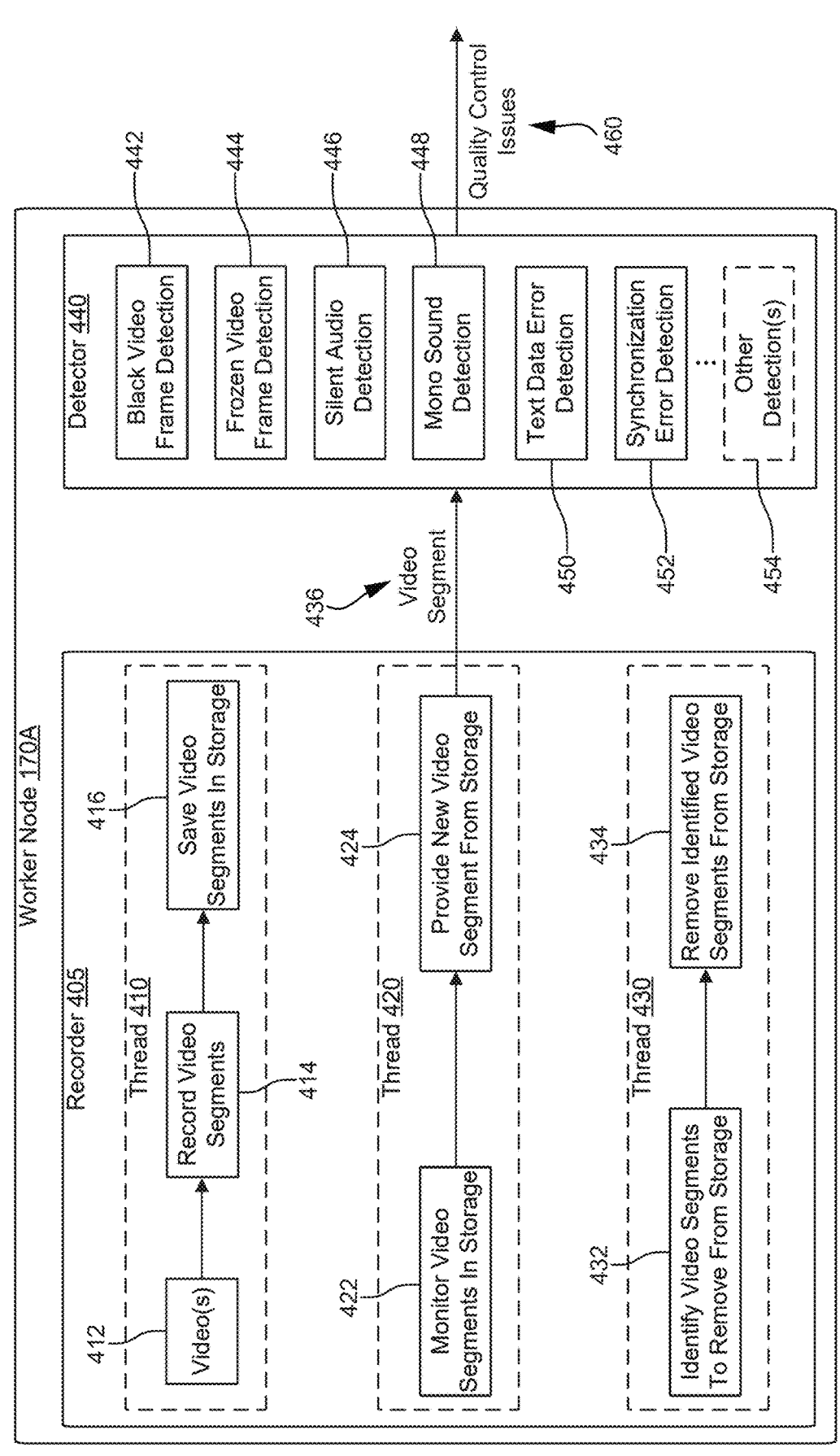
FIG. 4 is a block diagram illustrating an example implementation of a worker node used to detect quality control issues associated with media content items, according to some examples of the present disclosure.

The network architecture 150 can deploy, run, implement, host, and/or support various resources (e.g., hosts, applications, services, functions, VMs, software containers, workloads, cloud appliances, service chains, hardware and/or software resources, AI/ML models, algorithms, application platforms, operating systems, etc.) using the system servers 126, the network fabric 155, the network devices 160, the network devices 162, the network device 165, the nodes 170, the node 175, the network 118, the content servers 120 shown in FIG. 1A, the audio command processing system(s) 128 shown in FIG. 1A, the QC system(s) 130 shown in FIG. 1A, the configuration system(s) 132 shown in FIG. 1A, the recorder 405 shown in FIG. 4, the detector 440 shown in FIG. 4, and/or any other software and/or hardware component.

In some cases, the network architecture 150 can implement and/or can be part of one or more cloud networks and can provide one or more cloud computing services such as, for example and without limitation, cloud storage, serverless computing, software-as-a-service (SaaS) (e.g., streaming services, content delivery services, video services, Internet content services, application services, conferencing services, etc.), infrastructure-as-a-service (IaaS), platform-as-a-service (PaaS) (e.g., web services, streaming services, content delivery services, content library services, conferencing services, video services, Internet content services, sharing and/or collaboration services, etc.), function-as-a-service (FaaS), and/or any other types of services such as desktop-as-a-service (DaaS), information technology management-as-a-service (ITaaS), managed software-as-a-service (MSaaS), mobile backend-as-a-service (MBaaS), etc.

The network architecture 150 described above illustrates a non-limiting example network architecture provided herein for explanation purposes. It should be noted that other network architectures can be implemented in other examples and are also contemplated herein. One of ordinary skill in the relevant art(s) will recognize in view of the disclosure that other network architectures can be used to implement one or more of the concepts, systems, techniques, devices, software, applications, methods, embodiments, elements, examples, and/or components disclosed herein.

FIG. 2 illustrates a block diagram of an example media device(s), according to some embodiments. In FIG. 2, the media device(s) 106 represents one media device. However, as previously noted, in FIG. 1A, the media device(s) 106 can include or represent a single media device or multiple media devices. Moreover, in FIG. 2, the media device(s) 106 may include a streaming system 202, processing system 204, storage/buffers 208, and user interface module 206. As described above, the user interface module 206 may include the audio command processing system 216.

The media device(s) 106 may also include audio decoder (s) 212 and video decoder(s) 214. The audio decoder(s) 212 can include or represent one or more audio decoders, and the video decoder(s) 214 can include or represent one or more video decoders. The audio decoder(s) 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. The media device(s) 106 can implement other applicable decoders, such as a closed caption decoder.

Similarly, the video decoder(s) 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. The video decoder(s) 214 may include one or more video codecs, such as but not limited to, H.263, H.264, H.265, VVC (also referred to as H.266), AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1A and 2, in some examples, the user(s) 134 may interact with the media device(s) 106 via, for example, the remote control 110. For example, the user(s) 134 may use the remote control 110 to interact with the user interface module 206 of the media device(s) 106 to select content, such as a movie, TV show, music, book, application, game, etc. The streaming system 202 of the media device(s) 106 may request the selected content from the content servers 120 over the network 118. The content servers 120 may transmit the requested content to the streaming system 202. The media device(s) 106 may transmit the received content to the display device(s) 108 for playback to the user(s) 134.

In streaming examples, the streaming system 202 may transmit the content to the display device(s) 108 in real time or near real time as it receives such content from the content servers 120. In non-streaming examples, the media device(s) 106 may store the content received from content servers 120 in storage/buffers 208 for later playback on display device(s) 108.

Automated Quality Control of Media Content and Channels

Referring to FIG. 1A, the QC system(s) 130 and the configuration system(s) 132 in one or more of the system servers 126 can operate, host, implement, run, and/or include a QC framework for monitoring the quality of media content and/or channels available to user(s) 134 via the media device(s) 106. For example, the QC system(s) 130 and the configuration system(s) 132 can operate, host, implement, run, and/or include a QC framework for monitoring the video and audio quality of live and/or streamed videos or video channels (and optionally the quality of audio-related text data such as closed captions and/or subtitles). In some aspects, the QC system(s) 130 can implement the example node architecture 300 shown in FIG. 3, including the worker nodes and the master node. For example, one or more of the system servers 126 can host, implement, include, and/or run the nodes 170 and the node 175. The one or more of the system servers 126 can implement and/or run the nodes 170 and the node 175 according to the node architecture 300 shown in FIG. 3, where the nodes 170 represent the worker nodes in FIG. 3 and the node 175 represents the master node in FIG. 3.

In the example illustrated in FIG. 3, the worker nodes 170 and the master node 175 can collaborate to perform some or all of the systems and techniques described herein. For example, the worker nodes 170 and the master node 175 can be used to implement various QC operations, techniques, embodiments, tasks, and/or methods described herein such as, for example and without limitation, creating video segments from a video, segmenting (e.g., partitioning, dividing/ subdividing, separating, slicing, etc.) a video into video segments, storing or saving the video segments, providing the video segments to a detector(s), analyzing the video segments, detecting quality issues in the video segments (e.g., errors, noise, black screens/frames, frozen video frames, silent audio, monophonic sound, audio-video synchronization issues, errors in audio-related text data such as subtitles and/or closed captions, synchronization errors between the audio-related text data and other media data such as video and/or audio, etc.), identifying classification errors of the video segments, removing/deleting saved/stored video segments that have been processed/completed by a detector (e.g., detector 440 shown in FIG. 4), analyzing audio content (e.g., audio signals, audio assets, audio feeds, audio waveforms, etc.), analyzing image data (e.g., frames such as still images and/or video frames), analyzing text data such as audio-related text data (e.g., closed captions, subtitles, etc.), analyzing and/or correcting metadata, detecting QC monitoring exceptions/exemptions (e.g., determining whether a video segment or portion thereof should be excluded from a QC analysis), and/or any other operations, techniques, and/or methods described herein.

The disclosure now continues with a further discussion of automated QC issue monitoring, detection, and reporting.

FIG. 3 is a diagram illustrating an example node architecture 300 implemented by the QC system(s) 130, according to some examples of the present disclosure. The QC system(s) 130 can use the node architecture 300 to implement, manage, and run the worker nodes 170 and the master node 175 for QC operations as described herein. For example, the QC system(s) 130 can use the node architecture 300 to implement a QC framework for monitoring media content and channels, such as live and/or streamed video content and channels, and detect QC issues with the media content and channels.

In this example, the node architecture 300 includes the master node 175 in communication with the worker nodes 170 and the configuration system(s) 132. In some examples, the worker nodes 170 and the master node 175 can represent node instances deployed or spawned on a cloud network (or any other network) such as the network architecture 150 and the network fabric 155 shown in FIG. 1B. For example, the worker nodes 170 and the master node 175 can represent instances instantiated on the cloud (e.g., network architecture 150). Each instance can include, run, represent, operate, and/or implement a virtual server and/or environment, such as a VM or software container, that uses resources (e.g., compute, memory, storage, and/or networking resources) on the cloud (e.g., network architecture 150) for respective workloads. In some aspects, the worker nodes 170 and/or the master node 175 can perform various tasks using parallel computing. For example, the worker nodes 170 can run software containers and use multithreading to perform various tasks in parallel, as further described below with respect to FIG. 4.

The worker nodes 170 can perform various QC operations, techniques, and/or methods described herein such as, for example and without limitation, creating or recording video segments from a video, segmenting a video into video segments, storing or saving the video segments, providing the video segments to a detector(s), analyzing the video segments, detecting quality issues in the video segments (e.g., errors, noise, black screens or video frames, frozen screens or video frames, silent audio, missing audio, missing audio channel such as monophonic sound, muted audio, audio-video synchronization issues, errors in audio-related text data such as subtitles or closed captions, synchronization errors between the audio-related text data and other media data such as video and/or audio, metadata errors, pixelation, aliasing, jitter, jerky video playback, video and/ or audio distortions, macroblocking, jerky video playback, video blur, etc.), identifying classification errors of the video segments, removing/deleting saved/stored video segments that have been processed/completed by a detector (e.g., detector 440 shown in FIG. 4), analyzing audio content (e.g., audio signals, audio assets, audio feeds, etc.), analyzing image data (e.g., frames such as still images and/or video frames), analyzing text data such as metadata and/or audio-related text data (e.g., closed captions, subtitles, etc.), detecting QC monitoring exceptions/exemptions (e.g., determining whether a video segment or a portion thereof should be excluded from a QC analysis), analyzing and/or correcting metadata, using multiple threads of execution to perform operations/tasks in parallel or concurrently (or at least partially in parallel or concurrently), and/or any other operations, techniques, and/or methods described herein.

For example, in some aspects, the worker nodes 170 can segment a video into video segments for monitoring/processing as described herein, save the video segments in storage such as local storage associated with the worker nodes 170, monitor the video segments of the video for QC issues, detect any QC issues in the video segments, remove any video segment that has been received and/or processed by respective detectors of the worker nodes 170 (e.g., detector 440 shown in FIG. 4), and create QC data containing information about any QC issues detected (e.g., create one or more records and/or alerts identifying any QC issues detected in any of the video segments and/or providing or reporting information about any QC issues detected in any of the video segments).

In some aspects, each of the worker nodes 170 can monitor one or more respective media content items and/or channels for QC issues. For example, the worker node 170A can be assigned by the master node 175 a specific video channel to monitor/check, such as a live video channel presenting a live video. The worker node 170A can record, save, partition, and/or segment the video from the specific video channel into video segments to be monitored for QC issues. The worker node 170A can process each video segment to detect any QC issues in the video segment. The QC issues detected in a video segment can include, for example and without limitation, frozen video frames, black video frames, audio issues (e.g., silent/muted audio or missing sound, missing audio channel (e.g., monophonic sound), corrupt sound, volume issues, noise, etc.), errors in audio-related text data (e.g., closed captions, subtitles, etc.) associated with the video segment, unsynchronized media content (e.g., out-of-sync media signals; mismatched video, audio, and/or audio-related text data; out-of-sync video, audio, and/or audio-related text data, etc.), video and/or audio distortions, image/video ghosting, aliasing, screen tearing, video flicker, jitter, stuck and/or dead pixels, cropped images, interlacing issues, loss of picture information and/or details, macroblocking, pixelation, image/video blur, choppy and/or jerky video playback, and/or any other QC issues.

If the worker node 170A detects a QC issue with a media asset (e.g., video, audio, audio-related text data, etc.) of a video segment, the worker node 170A can create a record of the QC issue. The record can identify the video segment, the QC issue, a timestamp and/or set of timestamps corresponding to the portion of the video segment where the QC issue occurred (e.g., a start time associated with the QC issue and/or an end time associated with the QC issue), a description of the video segment and/or the QC issue, a copy of the video segment, a proposed solution to the QC issue, metadata associated with the video segment, an indication of the location of the video segment within the overall video, a channel name and/or identifier, a record identifier, a status of the QC issue, a feedback status associated with the QC issue or the detection of the QC issue, a reason for the record (e.g., the QC issue and/or a cause of the QC issue), a channel or content title or name, a type of channel and/or content, a suggested or proposed solution, an action item, a QC issue detection result and/or log, and/or any other information. The record can be used to identify the QC issue and associated video segment, determine whether to correct the QC issue, determine whether to remove the video containing the video segment with the QC issue from a channel and/or content library, determine what to do about the QC issue and/or how to respond to the QC issue, and/or determine how to fix the QC issue.

Once the worker node 170A has completed processing the video segment to check for QC issues, the worker node 170A can remove the video segment from storage to free storage space for other video segments and/or data. The worker node 170A can continuously and/or iteratively save or record new video segments of respective videos and/or channels, monitor the new video segments for QC issues, generate records for any QC issues detected, and remove video segments from storage once such video segments are processed/checked for QC issues. In some cases, the worker node 170A can run a virtual environment, such as a software container, and use multithreading to perform some or all of such operations in parallel. For example, the worker node 170A can use a first thread to record or save new video segments, a second thread to provide the new video segments to a detector (e.g., detector 440 shown in FIG. 4) configured to check the new video segments for QC issues, a third thread to remove video segments from storage once such video segments are processed/checked for QC issues, a fourth thread to check video segments for QC issues (e.g., via a detector such as detector 440 shown in FIG. 4), a fifth thread to create records for QC issues detected, and/or any other threads for any other tasks or operations.

Similarly, the master node 175 can assign respective channels and/or media content (e.g., videos, etc.) to the worker node 170B, the worker node 170C, the worker node 170D, the worker node 170E, and the worker node 170N. The worker node 170B, the worker node 170C, the worker node 170D, the worker node 170E, and the worker node 170N can each monitor its respective channel(s) and/or media content(s) assigned to check for potential QC issues in such channel(s) and/or media content(s), as previously described with respect to worker node 170A. For example, the worker node 170B, the worker node 170C, the worker node 170D, the worker node 170E, and the worker node 170N can each record/save video segments from the respective channel(s) and/or media content(s) assigned to that worker node, provide the video segments to a corresponding detector (e.g., detector 440 shown in FIG. 4) configured to check for QC issues, check the video segments for QC issues, record and/or report any QC issues found on any video segments, and remove video segments from storage after being processed/checked for QC issues.

The master node 175 can assign respective channels and/or media content to each of the worker nodes 170 based on configuration data 310 the master node 175 receives from the configuration system(s) 132. In some examples, the configuration data 310 can include data entered by a user to the configuration system(s) 132 via a user interface (UI) provided by the configuration system(s) 132. In other examples, the configuration data 310 can additionally or alternatively include data generated by the QC system(s)

130, the configuration system(s) 132, the content servers 120, an application, a device, and/or any other component. In some cases, the configuration data 310 can include a list of channels and/or content items to be monitored and checked for QC issues. In some aspects, the list (or a portion of the list) can be entered by the user to the configuration system(s) 132 via the UI. In other aspects, the list (or a different portion of the list) can additionally or alternatively be generated by the QC system(s) 130 and/or the configuration system(s) 132 based on the channels and/or content items available (e.g., channels and/or content items available from the content servers 120, a media application or player, an online or cloud-based streaming service, a content delivery network, an online television service, a media content library, a streaming platform, a media subscription service, a platform hosting various media channels, and/or any other source of media content and/or channels), channel and/or content item information, QC preferences and/or parameters, and/or any other information.

In some cases, the configuration data 310 can also include other information. For example, the configuration data 310 can include metadata associated with the channels and/or media content items to be monitored and checked for QC issues, the addresses or locations (e.g., uniform resource locator (URL) addresses, uniform resource identifiers (URIs), Internet Protocol (IP) addresses, etc.) of the channels and/or content items to be monitored, configuration information pertaining to the detection algorithm(s) used to detect QC issues on video segments, performance and/or operating constraints, parameters for checking channels and/or media content items for QC issues, information used to identify content/segments that should be excluded/exempted from the QC checks (e.g., keywords for identifying content containing such keywords that should be excluded from the QC checks, etc.), QC issues that should be checked, instructions for checking video segments for QC issues, instructions for what to do when a QC issue is detected, QC thresholds, video segment intervals, detection thresholds, flags, rules, and/or any other information.

The configuration system(s) 132 can provide the configuration data 310, including any channels and/or media content items selected/designated for monitoring and QC analysis, to the master node 175. In some examples, the configuration system(s) 132 can provide the configuration data 310 to the master node 175 via an interface, such as an API. In other examples, the configuration system(s) 132 can provide the configuration data 310 to the master node 175 in any other way. For example, the configuration system(s) 132 can provide the configuration data 310 to the master node 175 via a network packet(s) containing the configuration data 310.

The master node 175 can use the configuration data 310 to assign and/or reassign respective channels and/or content items to the worker nodes 170 for monitoring, orchestrate the worker nodes 170, schedule QC operations by the worker nodes 170, provide QC settings and/or parameters to the worker nodes 170 to be used by the worker nodes 170 when processing their respective channels and/or content items, manage the worker nodes 170, manage the overall QC process, communicate with the worker nodes 170, check a status or health of the worker nodes 170, instantiate and uninstantiate any of the worker nodes 170, configure the worker nodes 170, trigger tasks and/or operations implemented by the master node 175 and/or the worker nodes 170, and/or perform or implement any other task, operation, action, parameter, setting, and/or data described herein.

In some examples, the master node 175 can instantiate (e.g., deploy, activate, spawn, execute, configure, etc.) worker nodes and uninstantiate (e.g., destroy, deactivate, remove, undeploy, terminate, etc.) worker nodes as needed. For example, the master node 175 can determine how many worker nodes to use to monitor a list of channels and/or content items, and spawn the worker nodes determined for the list of channels and/or content items. The master node 175 can assign a channel or content item (e.g., video, etc.) per worker node, or can assign more than one channel or content item to any given worker node. In some cases, the master node 175 can implement limits on the number of channels or content items monitored by a given worker node based on one or more factors such as, for example and without limitation, a compute capacity of the worker node, a type(s) of channel(s) or content item(s) assigned to the worker node, a type(s) of QC issues that the worker node should check for, performance parameters (e.g., latency/lag, issue detection accuracy, detection thresholds, speed, bandwidth, etc.), content characteristics, network conditions, compute resources available and/or unavailable, channel and/or content priorities, etc.

In some aspects, the master node 175 can check a health of the worker nodes 170. For example, the master node 175 can periodically send health checks to the worker nodes 170 to verify a status and/or health of the worker nodes 170. The health checks can include, for example and without limitation, heartbeat messages, echo request messages, message probes, pings, API messages, log data requests, activity data requests, device status information requests, etc. In some cases, the master node 175 can additionally or alternatively configure inactivity thresholds that the master node 175 can use to check a status/health of the worker nodes 170. For example, the master node 175 can set a period of time as an inactivity threshold for the worker nodes 170. If the period of time lapses without the master node 175 receiving a message, reply, heartbeat, and/or signal from a worker node, the master node 175 can determine that the worker node does not pass the health check (e.g., has failed, has encountered an error, is down, etc.). As another example, if the period of time lapses and the master node 175 determines that the worker node did not perform any operations/tasks within the period of time and/or did not show activity (or certain type of activity) within the period of time, the master node 175 can determine that the worker node did not pass the health check. By contrast, if the master node 175 receives a message, reply, heartbeat, and/or signal from a worker node within a period of time, if the master node 175 detects activity by the worker node within the period of time, and/or if the master node 175 detects an operation/task performed by the worker node within the period of time, the master node 175 can determine that the worker node passed the health check.

If the master node 175 determines that a worker node did not pass a health check, the master node 175 can terminate the worker node and reassign any channel(s) and/or content item(s) assigned to that worker node to a different worker node, which can include an existing worker node or a new worker node instantiated/spawned by the master node 175. For example, if the master node 175 determines that the worker node 170A did not pass a health check, the master node 175 can terminate the worker node 170A and reassign any channel(s) and/or content item(s) assigned to the worker node 170A to an existing worker node that determined to be healthy (e.g., active, running, responsive, etc.) and have capacity to handle the channel(s) and/or content item(s), such as worker node 170B. As another example, if the master node 175 determines that the worker node 170A did not pass a health check, the master node 175 can terminate the worker node 170A, instantiate/spawn a new worker node, and reassign any channel(s) and/or content item(s) assigned to the worker node 170A to the new worker node.

In some cases, the master node 175 can instantiate/spawn a new worker node, rather than using an existing worker node, by default. In other cases, the master node 175 can instantiate/spawn a new worker node, rather than using an existing worker node, if all existing worker nodes available are assigned a respective channel(s) and/or content item(s), if none of the existing worker nodes are healthy and available (e.g., have capacity to handle the channel(s) and/or content item(s) associated with the worker node 170A), if the master node 175 determines that a new worker node is needed for that channel(s) and/or content item(s) to satisfy an operating and/or performance goal or threshold, and/or for any other reason. The master node 175 can monitor the health status of the worker nodes 170, the activity of the worker nodes 170, the performance of the worker nodes 170, the processing demands on the worker nodes 170, the amount of processing needed from the worker nodes 170, a status of the network, a progress of the worker nodes 170, resource availability in the network, and/or other information, and can use any of the information to determine whether (and/or when) to instantiate/spawn new worker nodes, uninstantiate/terminate any existing worker nodes, schedule tasks and/or operations, assign/reassign channels and/or content items to worker nodes, adjust or configure worker node workloads, set QC operations and/or parameters, and/or make any other decisions and/or adjustments.

In some cases, the master node 175 can also trigger and/or configure tasks implemented by the worker nodes 170, orchestrate the worker nodes 170, monitor the worker nodes 170, assign tasks to the worker nodes 170, assign quality control operations to the worker nodes 170, provide specific media content/channels to specific worker nodes for QC monitoring, schedule tasks by the worker nodes 170, provide QC parameters and/or instructions to the worker nodes 170, manage the worker nodes 170, manage and/or store outputs from the worker nodes 170, monitor resource usage, etc.

The node architecture 300 can be flexible to allow the QC system(s) 130, the worker nodes 170, and/or the master node 175 to adapt to workload fluctuations, network conditions, node states/statuses, resource capabilities and/or conditions, QC detection preferences or requirements, changes in QC checks, changes in the channels and/or content items monitored, changes in the architecture, and/or any other changes. For example, the node architecture 300 can be adjusted to run new worker nodes and/or terminate existing worker nodes to adapt to processing needs and capabilities. Moreover, the node architecture 300 can be extensible and/or can easily be modified to add or modify any features, nodes, devices, functionalities, requirements, plugins, operations, tasks, resources, detectors, algorithms, and/or capabilities.

The number of master and worker nodes shown in FIG. 3 is merely an illustrative example provided for explanation purposes. One of ordinary skill in the relevant art(s) would recognize from the disclosure that, in other examples, the node architecture 300 can include a different number of master and/or worker nodes than shown in FIG. 3. For example, in other cases, the node architecture 300 can include more than one master node and/or more or less worker nodes than the number of worker nodes shown in FIG. 3.

FIG. 4 is a block diagram illustrating an example architecture 400 of a worker node used to detect QC issues on media channels/content, according to some examples of the present disclosure. In the example, the architecture 400 illustrates the worker node 170A from the node architecture 300 shown in FIG. 3. The worker node 170A can include a software environment, a virtual environment, or execution environment used to run and execute workloads. For example, the worker node 170A can include a software container, a VM, an OS, or any other executing environment, which the worker node 170A can use to host and execute workloads. For explanation purposes, the worker node 170A is described in the examples below as running a software container used to host and execute workloads. In some examples, the software container can be configured to use multithreading to allow the worker node 170A to perform various tasks in parallel using different processor threads.

As shown, the worker node 170A can include a recorder 405 for obtaining and managing video segments to be checked for QC issues, and a detector 440 used to detect QC issues in video segments from the recorder 405. In some examples, the recorder 405 can include or be implemented by one or more algorithms and/or models. Similarly, the detector 440 can include, implement, and/or be implemented by one or more algorithms and/or models, such as one or more computer vision algorithms, image processing algorithms, audio processing algorithms, audio detection and/or recognition algorithms, object detection and/or recognition algorithms, text processing algorithms, QC issue detection algorithms, AI/ML algorithms, etc.

In the example architecture 400, the recorder 405 is configured to run/use multiple processing threads 410, 420, and 430. The recorder 405 can use the threads 410, 420, and 430 to perform multiple tasks/operations in parallel. For example, the recorder 405 can use the thread 410 to obtain video segments from a video or video channel to be monitored by the worker node 170A. Here, the thread 410 can first obtain a video(s) 412 to be monitored by the worker node 170A. For example, the thread 410 can use an address of the video(s) 412, such as a URL, provided in the configuration data 310 from the configuration system(s) 132, to obtain the video(s) 412. At block 414, the thread 410 can record video segments from the video(s) 412. For example, the thread 410 can record or copy video segments from the video(s) 412, or partition/segment the video(s) 412 into video segments. In some examples, the thread 410 can record/copy the video segments or partition/segment the video(s) 412 into video segments based on a segmenting scheme.

In some cases, the segmenting scheme can be based on time intervals such that each video segment includes a portion of the video(s) 412 having a length based on the time interval. In other cases, the segmenting scheme can additionally or alternatively be based on content breaks and/or other factors used to identify the video segments for the video(s) 412. In some aspects, the video segments can have a same, fixed length, such as a fixed length based on a configured time interval. In other aspects, the video segments (or some of the video segments) can have different lengths, which can be determined based on one or more factors, such as time intervals, content breaks, segment limits (e.g., maximum length, minimum length, etc.), and/or other factors.

At block 416, the thread 410 can then save the video segments in storage. In some examples, the thread 410 can save new video segments as they are recorded/copied/created. Moreover, the thread 410 can save the new video segments in a local storage, such as a storage device associated with the worker node 170A, and/or a network storage.

As the thread 410 obtains the video(s) 412, determines the video segments and saves the video segments in storage, the thread 420 can monitor the video segments and provide new video segments from storage to the detector 440 for processing. In other words, the thread 410 and the thread 420 can run/operate in parallel or significantly in parallel, which can increase the efficiency and performance of the worker node 170A.

As shown in thread 420, at block 422, the thread 420 monitors the video segments saved in storage by the thread 410. The thread 420 can detect new video segments added to storage, and identify each new video segment for processing by the detector 440. For example, the thread 420 can identify the video segment 436 in storage as a video segment that has not been provided to the detector 440 and is ready for processing by the detector 440. Upon identifying the video segment 436, at block 424, the thread 420 can obtain the video segment 436 from storage and provide the video segment 436 to the detector 440 for processing as further described herein.

While the thread 410 and/or the thread 420 operate, the recorder 405 can run the thread 430 to remove any video segments from storage that have already been provided to the detector 440 and/or processed by the detector 440. For example, the recorder 405 can run the thread 430 in parallel to or significantly in parallel to the thread 410 and/or the thread 420. The thread 430 can remove video segments that have been provided to the detector 440 and/or processed by the detector 440 to free storage space for other video segments and to avoid running out of storage space, particularly if the thread 410 saves new video segments in storage on an ongoing/continuous basis. As shown in thread 430, at block 432, the thread 430 first identifies video segments to remove from storage. The thread 430 can identify video segments that have already been provided by thread 420 to the detector 440 and/or have already been processed by the detector 440. At block 434, the thread 430 then removes any identified video segments from storage to free storage space for other video segments and/or data.

The detector 440 can receive the video segment 436 (and any other video segment) from the thread 420 of the recorder 405, and process the video segment 436 to detect QC issues 460 in the video segment 436. In the example shown in FIG. 4, the detector 440 includes a black video frame detection algorithm 442, a frozen video frame detection algorithm 444, a silent audio detection algorithm 446, a monophonic sound detection algorithm 448, a text data error detection algorithm 450, a synchronization error detection algorithm 452, and optionally one or more other detection algorithms 454. However, the examples shown in FIG. 4 are non-limiting examples provided for illustration purposes. In other examples, the detector 440 can include a different number of QC detection algorithms than shown in FIG. 4 and/or can detect other QC issues (in addition to or in lieu of one or more of the QC issues from FIG. 4) that are not shown in FIG. 4 (or described with respect to FIG. 4)

In some cases, the black video frame detection algorithm 442, the frozen video frame detection algorithm 444, the silent audio detection algorithm 446, the monophonic sound detection algorithm 448, the text data error detection algorithm 450, the synchronization error detection algorithm 452, and/or the one or more other detection algorithms 454 can be, represent, or can be implemented by a same overall detection algorithm. In other cases, the black video frame detection algorithm 442, the frozen video frame detection algorithm 444, the silent audio detection algorithm 446, the monophonic sound detection algorithm 448, the text data error detection algorithm 450, the synchronization error detection algorithm 452, and/or the one or more other detection algorithms 454 can be, represent, or can be implemented by two or more different detection algorithms. For example, the black video frame detection algorithm 442 and the frozen video frame detection algorithm 444 can be implemented by a same algorithm or different algorithms. Similarly, the silent audio detection algorithm 446 and the monophonic sound detection algorithm 448 can be implemented by a same algorithm or different algorithms.

The detector 440 can use the black video frame detection algorithm 442 to determine whether the video segment 436 includes black video frames (or a threshold amount of sequential black video frames). The black video frame detection algorithm 442 can detect black video frame QC issues if it detects black video frames in the video segment 436 or a threshold amount of sequential black video frames. In some cases, to detect black video frames, the black video frame detection algorithm 442 can convert the video segment 436 into a sequence of images representing the video frames in the video segment 436. The black video frame detection algorithm 442 can then process the sequence of images to determine whether any sequential images (or a threshold number of sequential images) are black images (and/or are images having a threshold amount of black pixels and/or pixels within a range of black or darker color intensities).

In some examples, the black video frame detection algorithm 442 may implement a threshold used to avoid false positives. The threshold can specify a minimum amount of time (e.g., a minimum time interval) of the video segment 436 (and/or associated video frames) that should contain black images/frames (and/or images/frames with a threshold amount of black pixels or pixels within a range from full black to a threshold level of black or black intensity) to trigger a detection of a black video frame issue, or a minimum number of sequential images that should contain a threshold amount of black pixels (or a range of pixel values representing a range from a full black intensity to a threshold black intensity). The minimum number of sequential images can include a number of images that corresponds to and/or represents a number of video frames that span a threshold time duration configured to trigger a black video frame detection issue. The threshold amount of time and/or threshold amount of sequential images can be used to prevent false positives so the black video frame detection algorithm 442 does not detect a black video frame issue if a black screen/frame is presented for only a short duration (e.g., below the threshold) and/or in cases where the black screen/frame does not represent a QC issue because the black screen/frame may be intentional, such as a frame(s) depicting a darker scene, or may not be sufficiently long in duration to qualify as a QC issue. Therefore, the threshold can prevent the black video frame detection algorithm 442 from triggering a black video frame detection issue in trivial or unnecessary cases.

To illustrate, if the threshold is set to 10 seconds, the black video frame detection algorithm 442 may be set to only detect black video frame issues if the black video frame detection algorithm 442 determines that one or more video frames depict a black screen for at least a period of 10 seconds (or identifies one or more black video frames or images that span or represent a period of at least 10 seconds within the video segment 436). In another example, the black video frame detection algorithm 442 can detect a black video frame issue if it determines that a number of sequential images (e.g., from the sequence of images generated from the video segment 436) that span or represent a period of at least 10 seconds (or any other threshold) within the video segment 436 are black (or have a threshold amount of black pixels and/or regions).

If the black video frame detection algorithm 442 detects one or more black video frames (or black images corresponding to one or more video frames from the video segment 436) but the duration corresponding to the one or more black video frames (or the black images) is less than the threshold duration (e.g., less than 10 seconds in the previous example), the black video frame detection algorithm 442 may determine that such video frames (or images) do not satisfy the criteria for detecting a black video frame issue (or specifying that the video segment 436 includes a black video frame QC issue) and/or do not trigger a black video frame detection. Thus, the threshold can prevent or reduce the amount of false positive results from the black video frame detection algorithm 442.

In some cases, to detect black video frame QC issues, the black video frame detection algorithm 442 can process a sequence of images generated from the video segment 436 using an image processing and/or computer vision algorithm. For example, the black video frame detection algorithm 442 can analyze the pixel values of the images in the sequence of images to determine whether any images include a threshold amount of pixels (or a certain percentage or proportion of pixels) that have a pixel value corresponding to the color black (e.g., such as pixel values of 0) and/or pixel values representing a range of black/dark intensities, such as a range of pixel values from 0 to n, where 0 represents full black and n represents a pixel value that has a certain intensity of black that is less than a full intensity of black.

The detector 440 can use the frozen video frame detection algorithm 444 to determine whether the video segment 436 includes one or more frozen video frames. In some examples, the frozen video frame detection algorithm 444 can convert the video segment 436 into a sequence of images and process the sequence of images to determine whether a threshold number of sequential images are frozen images (e.g., do not include any or a threshold amount of motion and/or changes). For example, the frozen video frame detection algorithm 444 may compare sequential images (and/or pixels within sequential images) within the sequence of images to determine whether there is any motion (or a threshold amount of motion) between the sequential images and/or whether there are any changes (or a threshold amount of changes) between the sequential images. If the frozen video frame detection algorithm 444 determines that two or more sequential images do not include any motion (or a threshold amount of motion) and/or any changes (or a threshold amount of changes), the frozen video frame detection algorithm 444 can determine that the two or more sequential images correspond to one or more frozen video frames.

In some aspects, the frozen video frame detection algorithm 444 can determine an optical flow in the two or more sequential images and use the optical flow from the two or more sequential images to determine whether there is any motion (or a threshold amount of motion) between the two or more sequential images. If the frozen video frame detection algorithm 444 determines that there is no motion (or less than a threshold amount of motion) between the two or more sequential images, the frozen video frame detection algorithm 444 can determine that the two or more sequential images correspond to one or more frozen video frames. On the other hand, if the frozen video frame detection algorithm 444 determines that there is motion (or a threshold amount of motion) between the two or more sequential images, the frozen video frame detection algorithm 444 can determine that the two or more sequential images do not correspond to one or more frozen video frames.

In some aspects, the frozen video frame detection algorithm 444 can additionally or alternatively compare pixel values in the two or more sequential images to determine whether there are any differences (or a threshold amount of differences) in the pixel values of the two or more sequential images. If the frozen video frame detection algorithm 444 determines that there are differences (or a threshold amount of differences) in the pixel values of the two or more sequential images, the frozen video frame detection algorithm 444 can determine that the two or more sequential images do not correspond to one or more frozen video frames. On the other hand, if the frozen video frame detection algorithm 444 determines that there are no differences (or there are less than a threshold amount of differences) in the pixel values of the two or more sequential images, the frozen video frame detection algorithm 444 can determine that the two or more sequential images correspond to one or more frozen video frames.

In some examples, the frozen video frame detection algorithm 444 may implement a threshold used to avoid false positives. The threshold can specify a minimum amount of time (e.g., a minimum video time interval) that should contain frozen images/frames to trigger a detection of a frozen video frame issue and/or a number of sequential images generated from the video segment 436 that should be frozen (e.g., that should have no motion and/or changes or a threshold amount of motion and/or changes) to trigger a frozen video frame detection. This way, the frozen video frame detection algorithm 444 can distinguish between frames that appear frozen for an amount of time that is too small to consider a QC issue and/or frames that intentionally appear to be frozen (e.g., because of the type of scene, a desired effect, a similarity between frames, etc.) and are not a result of a QC issue.

To illustrate, if the threshold is set to 10 seconds, the frozen video frame detection algorithm 444 will only detect frozen video frames if the frozen video frame detection algorithm 444 determines that one or more video frames are frozen for at least a period of 10 seconds (or identifies one or more sequential images corresponding to video frames that span or represent a period of at least 10 seconds within the video segment 436). In another example, the frozen video frame detection algorithm 444 can detect a frozen video frame issue if the frozen video frame detection algorithm 444 determines that a number of sequential images (e.g., from the sequence of images generated from the video segment 436) that span or represent a period of at least 10 seconds (or any other threshold) within the video segment 436 are frozen (e.g., have no motion and/or changes or have less than a threshold amount of motion and/or changes).

If the frozen video frame detection algorithm 444 detects one or more frozen video frames (or frozen images corresponding to one or more video frames from the video segment 436) but the duration corresponding to the one or more frozen video frames (or the frozen images) is less than the threshold duration (e.g., less than 10 seconds in the previous example), the frozen video frame detection algorithm 444 may determine that such video frames (or images) do not satisfy the criteria for detecting a frozen video frame (or specifying that the video segment 436 includes a frozen video frame QC issue) and/or do not trigger a frozen video frame detection. Thus, the threshold can prevent or reduce the amount of false positive results from the frozen video frame detection algorithm 444.

The detector 440 can use the silent audio detection algorithm 446 to determine whether the video segment 436 includes silent audio (or a threshold amount of silent audio). The silent audio detection algorithm 446 can determine whether the video segment 436 includes silent audio if the silent audio detection algorithm 446 that the volume of an audio of the video segment 436 is 0 for a threshold period of time (e.g., a minimum time interval), the volume of the audio is below a threshold (e.g., which can be greater than 0 but less than a maximum volume that would trigger a silent audio detection), or the video segment 436 is missing audio (or is missing audio for a threshold period of time in the video segment 436).

In some examples, to detect silent audio, the silent audio detection algorithm 446 can analyze a waveform of an audio signal associated with the video segment 436 and/or an energy level of the audio signal. For example, the silent audio detection algorithm 446 can determine that a portion of the audio signal corresponds to silent audio (or a threshold volume configured to trigger a silent audio detection) if a waveform of that portion of the audio signal is flat or has less than a threshold amplitude and/or frequency. In some examples, the silent audio detection algorithm 446 can determine that the portion of the audio signal corresponds to silent audio if the energy associated with that portion of the audio signal is below a threshold.

In some aspects, the silent audio detection algorithm 446 may implement a threshold used to avoid false positives. The threshold can specify a minimum amount of audio time (e.g., a minimum audio time interval) that should contain silent audio (or audio with less than a threshold volume) to trigger a detection of a silent audio issue. The silent audio detection algorithm 446 may only detect a silent audio issue if it detects silent audio (or audio having less than a threshold volume) for the threshold period of time. For example, if the threshold period of time is 10 seconds, the silent audio detection algorithm 446 may only detect a silent audio issue in an audio signal if a waveform of the audio signal that is flat (or has less than a threshold amplitude and/or frequency) spans more than the threshold amount of time, or if a portion of the audio signal having less than a threshold amount of energy spans more than the threshold amount of time. This way, the silent audio detection algorithm 446 can ignore silent audio (or audio having a volume that would otherwise satisfy a silent audio threshold) present for less than the threshold amount of time, as such silent audio may be intentional, may represent a brief period of silence, and/or may not be a sufficient nuisance to qualify as a QC issue.

The detector 440 can use the monophonic sound detection algorithm 448 to determine whether the video segment 436 is includes monophonic sound meaning that the video segment 436 is missing an audio channel or has an audio channel that has silent or muted sound or has sound with a volume below a threshold. The monophonic sound detection algorithm 448 can determine whether the video segment 436 includes monophonic sound if the monophonic sound detection algorithm 448 that the volume of an audio channel associated with the video segment 436 is 0 for a threshold period of time (e.g., a minimum time interval), the volume of the audio channel is below a threshold (e.g., which can be greater than 0 but less than a maximum volume that would trigger a silent audio detection) for the threshold period of time, an audio of the video segment 436 only includes one audio channel, a waveform of an audio channel is flat (or has less than a threshold amplitude and/or frequency) for a threshold period of time, or an energy of an audio channel is below a threshold for a threshold period of time.

In some examples, to detect monophonic sound, the monophonic sound detection algorithm 448 can analyze a waveform and/or energy of an audio channel signal associated with the video segment 436. For example, the monophonic sound detection algorithm 448 can determine that an audio channel is missing, is silent (or has less than a threshold volume). In some examples, the monophonic sound detection algorithm 448 can detect monophonic sound if a waveform associated with an audio channel is flat, missing, or has less than a threshold amplitude and/or frequency for at least a threshold period of time. In some examples, the monophonic sound detection algorithm 448 can detect monophonic sound if the energy of an audio channel is below a threshold for a threshold period of time.

The detector 440 can use the text data error detection algorithm 450 to determine whether audio-related text data from the video segment 436, such as subtitles and/or closed captions, have errors such as grammatical errors, incorrect text, etc. The text data error detection algorithm 450 can determine whether the audio-related text data associated with the video segment 436 includes errors by analyzing the text for errors and/or comparing the text with a transcription and/or translation of an audio of the video segment 436.

The detector 440 can also use the synchronization error detection algorithm 452 to determine whether any media assets of the video segment 436 are not synchronized (e.g., are out-of-sync). The media assets can include video, audio, and/or audio-related text data (e.g., closed captions, subtitles). In some examples, the synchronization error detection algorithm 452 can determine whether a portion of audio and a corresponding portion of video are out-of-sync. For example, the synchronization error detection algorithm 452 can determine whether the audio portion lags or is ahead of a corresponding portion of video. If the audio portion lags or is ahead of the corresponding portion of video, the synchronization error detection algorithm 452 can determine that the corresponding audio and video are out-of-sync. As another example, the synchronization error detection algorithm 452 can determine whether a portion of audio-related text data lags or is ahead of a corresponding portion of video and/or audio. If the synchronization error detection algorithm 452 determines that the portion of audio-related text data lags or is ahead of the corresponding portion of video and/or audio, the synchronization error detection algorithm 452 can determine that the portion of audio-related text data is out-of-sync with the corresponding portion of video and/or audio.

In some cases, the detector 440 can optionally use a detection algorithm(s) 454 to detect other QC issues associated with the video segment 436. Non-limiting examples of other QC issues that can be detected by the detection algorithm(s) 454 can include video and/or audio distortions, image/video ghosting, aliasing, sound volume issues, missing or muted sound, screen tearing, pixelation, macroblocking, video flicker, jitter, stuck and/or dead pixels, cropped images, interlacing issues, loss of picture information and/or details, image/video blur, choppy and/or jerky video playback, among others.

The detector 440 can generate an output identifying any QC issues 460 based on the detection results from the black video frame detection algorithm 442, the frozen video frame detection algorithm 444, the silent audio detection algorithm 446, the monophonic sound detection algorithm 448, the text data error detection algorithm 450, the synchronization error detection algorithm 452, and/or the detection algorithm(s) 454. The QC issues 460 can include black video frame issues, frozen video frame issues, silent audio issues, monophonic sound issues, text data errors, synchronization errors, and/or other QC issues. In some aspects, the detector 440 can generate one or more records identifying the QC issues 460 detected by the detector 440.

In some examples, a record generated for a particular QC issue detected can identify the QC issue, a media asset (e.g., an audio asset, a video asset, an audio-related text data asset, etc.) associated with the particular QC issue, a timestamp and/or set of timestamps corresponding to the media asset(s) and/or portion of the video segment 436 where the QC issue occurred (e.g., a start time associated with the QC issue and/or an end time associated with the QC issue), a description of the QC issue, a copy of the video segment 436, a copy of any media asset(s) containing the QC issue, a proposed solution to the QC issue, metadata associated with the video segment 436, an indication of the location of the video segment 436 within the overall video, a channel name and/or identifier associated with the video segment 436 and/or the QC issue, a record identifier, a status of the QC issue, a feedback status associated with the QC issue or the detection of the QC issue, a reason for the record (e.g., the QC issue and/or a cause of the QC issue), a channel or content title or name, a type of channel and/or content associated with the video segment 436 and/or the QC issue, a suggested or proposed solution to the QC issue, an action item, and/or any other information. The record can be used to identify the QC issue and associated video segment, determine whether to correct the QC issue, determine whether to remove the video containing the video segment 436 and/or media asset(s) with the QC issue from a channel and/or content library, determine what to do about the QC issue and/or how to respond to the QC issue, and/or determine how to fix the QC issue.

FIG. 5 is a flowchart illustrating an example method 500 for determining any video segments associated with a video should be excluded from QC checks and determining whether any video segments that are not excluded from the QC checks contain any QC issues, according to some examples of the present disclosure. The method 500 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the method 500. Further, some of the steps may be performed simultaneously, or in a different order than shown in FIG. 5, as will be understood by a person of ordinary skill in the art. Method 500 shall be described with reference to FIGS. 3 and 4. However, method 500 is not limited to those examples.

In FIG. 5, the method 500 describes a process implemented by the detector 440 of a compute node (e.g., worker node 170A) for each video segment of a video received from the recorder 405 (e.g., from the thread 420 of the recorder 405). For example, the detector 440 can implement the method 500 for a video segment and, when the method 500 is complete for that video segment, the detector 440 can implement the method 500 for every other video segment from the recorder 405 until all of the video segments of the video have been processed as described herein.

At step 502, the detector 440 implemented by the worker node 170A can obtain, from the recorder 405 (e.g., from the thread 420 of the recorder 405) a video segment (e.g., video segment(s) 436) associated with a video. The video can include video content (e.g., video frames, video assets, video signals, a video feed, etc.), audio content (e.g., audio signals, audio assets, an audio feed, etc.), audio-related text data (e.g., closed captions, subtitles, etc.), metadata, and/or any other relevant data. In some examples, the video can include a live video, an on-demand video, an animated video, a video recording, a video clip, a video stream, a movie, a TV show, a video podcast, a conference video, and/or any other video.

At step 504, the detector 440 can convert the video segment into a sequence of images. The detector 440 can use the sequence of images to determine whether the video segment should be excluded from a QC analysis and, if the video segment should not be excluded from the QC analysis, the detector 440 can use the sequence of images to detect QC issues in the video segment as further described herein.

At step 506, the detector 440 can determine whether the video segment should be excluded from a QC analysis based on the sequence of images associated with the video segment. In some examples, the detector 440 can determine whether to exclude the video segment from the QC analysis based on one or more keywords. The one or more keywords can be used to identify any video segments that should be omitted from the QC analysis, such as video segments including or representing placeholders/slots in the video for inserting content (e.g., advertisements, invitational content, banners, etc.) in the video. In some examples, the detector 440 can search the sequence of images for any instances of the one or more keywords to determine whether the video segment should be omitted from the QC analysis.

For example, a system and/or user can specify one or more keywords that, if contained in a video segment, may indicate that the video segment corresponds to a certain type of content item or content placement slot that should be excluded from the QC analysis, such as an advertisement, an advertisement slot, a bumper item, a video transition, a video introduction, a video recap, a video error/failure, a video preview, etc. Non-limiting examples of the one or more keywords can include terms such as "break" (e.g., after the break, when we return from the break, etc.), "back" (e.g., we will be right back), "right" (e.g., we will right back), "commercial" (e.g., which can indicate that the video segment includes or represents a commercial or commercial slot), "advertisement" (e.g., which can suggest that the video segment includes or represents an advertisement or advertisement slot), "watching" (e.g., you are watching), "begin" (e.g., the video will begin shortly), "continue" (e.g., the video will continue shortly), "maintenance" (e.g., this portion of the video is under maintenance, we will return after maintenance, etc.), "local", "under", "live", "we will" or "we'll", among others.

The detector 440 can search the images from the sequence of images associated with the video segment for text in the images that matches any of the one or more keywords and, if an image has text that matches any of the one or more keywords, the detector 440 can determine that the video segment associated with such image should be excluded from the QC analysis. The text in the image can include text displayed in that image and/or audio-related text associated with that image, such as subtitles or closed captions. In some cases, the detector 440 can additionally or alternatively search an audio associated with the video segment for any utterances containing any of the one or more keywords. If the detector 440 finds an utterance in the audio of the video segment that includes or matches any of the one or more keywords, the detector 440 can exclude the video segment associated with that audio from the QC analysis.

If the detector 440 determines at step 506 that the video segment should be excluded from the QC analysis, the method 500 can return to step 502 where the detector 440 can obtain another video segment of the video (if any video segments of the video are available and have not been processed using the method 500) for processing in the method 500. On the other hand, if the detector 440 at step 506 determines that the video segment should not be excluded from the QC analysis, the method 500 can continue to step 508.

At step 508, the detector 440 can determine, based on the sequence of images, whether the video segment has any video quality issues (e.g., video-related QC issues). The video quality issues can include black video frames, frozen video frames, video/image blur, video/image ghosting, aliasing, interlacing issues, video distortions, pixelation, macroblocking, stuck or dead pixels, jitter, noise, and/or any other video issues. In some examples, the detector 440 can determine whether a certain amount or ratio of pixels of one or more images from the sequence of images includes a pixel value representing the color black (e.g., such as a pixel value of 0) and/or pixel values representing a range of black/dark intensities, such as a range of pixel values from 0 to n, where 0 represents full black and n represents a pixel value that has a certain intensity of black that is less than a full intensity of black. If the detector 440 determines that such amount or ratio of pixels of the one or more images includes a pixel value representing the color black and/or pixel values representing a range of black/dark intensities, the detector 440 can determine that the one or more images correspond to black video frames, and determine that the video segment has video quality issues (e.g., black video frames).

In some examples, if the detector 440 determines that the number of images determined to correspond to black video frames exceeds a threshold or a duration of a video portion corresponding to such black video frames exceeds a threshold duration, the detector 440 can determine that the video segment includes a video quality issue that includes black video frames. The threshold number of images determined to correspond to black video frames or the threshold duration can be used to exclude scenarios where one or more images associated with the video segment are determined to correspond to one or more black video frames, but the duration of the video portion corresponding to such black video frames is too short (e.g., is less than the threshold duration) for such black video frames to be considered a video quality issue with that video segment.

In some aspects, the detector 440 can compare images in the sequence of images to determine whether the any of such images include or correspond to frozen video frames. For example, the detector 440 can determine that the sequence of image frames corresponds to frozen video frames if two or more sequential images are the same or have less than a threshold amount of motion, which can indicate that the two or more sequential images include or represent frozen video frames. In some examples, the detector 440 can determine whether two or more sequential images have less than a threshold amount of motion used to detect frozen video frames based on an optical flow estimated for the two or more sequential images or a difference between the two or more sequential images. For example, if the optical flow indicates less than a threshold amount of motion between the two or more sequential images or a difference between the two or more sequential images is below a threshold (and thus indicates that there is less than a threshold amount of motion between the two or more sequential images), the detector 440 can determine that the two or more sequential images correspond to or represent frozen video frames. Accordingly, the detector 440 can determine that the video segment associated with the two or more sequential images includes a video quality issue, which in this example is frozen video frames.

At step 510, the detector 440 can determine a waveform of an audio (e.g., an audio signal, an audio asset, an audio feed, etc.) of the video segment. The detector 440 can use the waveform to determine whether the video segment associated with the audio has any audio quality issues, as further described below. For example, at step 512, the detector 440 can determine, based on the waveform of the audio of the video segment, whether the video segment associated with the audio has audio quality issues. In some examples, the detector 440 can determine that the video segment has silent or muted audio if the waveform is flat, has less than a threshold amplitude, has less than a threshold frequency, and/or has less than a threshold energy. If the detector 440 determines that the video segment has silent or muted audio, the detector 440 can determine that the video segment has audio quality issues, which in this example include silent or muted audio.

In some cases, the waveform and associated audio can correspond to an audio channel associated with the video segment, and the detector 440 can obtain another waveform of another audio channel of the video segment to determine whether the video segment is missing an audio channel (e.g., has monophonic sound). Here, the detector 440 can compare the waveform of the first audio channel with the waveform of the second audio channel to determine whether the video segment is missing an audio channel (e.g., has monophonic sound). For example, if the waveform of the first audio channel is flat or flatter than the waveform of the second audio channel, the detector 440 can determine that the video segment has monophonic sound. As another example, if the waveform of the first audio channel has less energy than the waveform of the second audio channel (or the energy of the waveform of the first audio channel is a threshold amount lower than the energy of the waveform of the second audio channel), the detector 440 can determine that the video segment has monophonic sound. This way, the detector 440 can determine that the video segment has an audio quality issue, which in these examples include a missing audio channel (e.g., monophonic sound).

At step 514, the detector 440 can optionally determine whether any text associated with the audio has quality issues. The text here can include audio-related text, such as closed captions and/or subtitles. The quality issues can include, for example and without limitation, errors in the text (e.g., grammatical errors, errors relative to the audio used to generate such text, etc.), issues with a synchronization between the text and other media (e.g., audio and/or video) of the video segment (e.g., out-of-sync text and audio and/or video), missing text, text incorrectly translated and/or transcribed from the audio, and/or any other text-related issues.

At step 516, the detector 440 can output any quality issues detected for the video segment. For example, the detector 440 can generate a record(s) identifying any video quality issues, audio quality issues, and/or text quality issues detected in the video segment.

In some cases, the record(s) of quality issues generated by the detector 440 can include, for each QC issue detected in the video segment, a description of the QC issue, an indication of the video segment determined to have the QC issue, a first timestamp identifying a start time within the video segment when the QC issue starts, a second timestamp identifying an end time within the video segment when the QC issue ends, an identifier of the video associated with the video segment, a suggested action and/or correction for the QC issue, a cause of the QC issue, a channel associated with the QC issue, a type of QC issue, a type of content of the video segment associated with the QC issue, an identifier of the record(s), a copy of the video segment, a copy of the video, a copy of any media assets associated with the QC issue, and/or any other relevant information.

Once the detector 440 has completed the method 500 for the video segment, the detector 440 can return to step 502 to obtain a next video segment from the recorder 405, if any are available. The detector 440 can similarly perform the method 500 for the next video segment and iteratively implement the method 500 for each video segment obtained from the recorder 405.

FIG. 6 is a flowchart illustrating an example method 600 for processing QC information and related content associated with a video segment(s) from a video, according to some examples of the present disclosure. The method 600 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the method 600. Further, some of the steps may be performed simultaneously, or in a different order than shown in FIG. 6, as will be understood by a person of ordinary skill in the art. Method 600 shall be described with reference to FIGS. 3 and 4. However, method 600 is not limited to those examples.

In FIG. 6, the method 600 describes a process implemented by the detector 440 of a compute node (e.g., worker node 170A) for processing a video segment(s) of a video received from the recorder 405 (e.g., from the thread 420 of the recorder 405), QC information determined for the video segment(s), and/or any content related to the video segment(s) and/or the QC information associated with the video segment(s). However, the method 600 can be used by the detector 440 to process other video segments of the video, QC information determined for the other video segments of the video, and/or any other content related to the other video segments and/or the QC information associated with the other video segments.

For example, the method 600 can be used by the detector 440 to process each video segment of a video as the video segment is received from the recorder 405 (e.g., from the thread 420 of the recorder 405), generate QC information for each video segment processed, and/or process any other content related to that video segment and/or the QC information associated with that video segment. Thus, in some examples, the detector 440 can perform multiple iterations of the method 600 (e.g., can perform the method 600 iteratively) to process video segments, associated QC information, and/or other related content on an ongoing basis (e.g., as each video segment is received from the recorder 405).

At step 602, the detector 440 can generate QC information for a video segment(s) from a video. For example, the detector 440 can receive the video segment(s) from the recorder 405 implemented by the worker node 170A (e.g., from the thread 420 of the recorder 405), and generate the QC information for the video segment(s) as previously described with respect to FIGS. 3 through 5 and further described below with respect to FIG. 7. The video can include video content (e.g., a sequence of video frames, a video feed(s), a video asset(s), etc.) and can optionally include audio content (e.g., an audio signal(s), an audio feed(s), an audio asset(s), an audio channel(s), etc.). In some examples, the video can also include audio-related text data, such as closed captions and/or subtitles.

The QC information can include an indication of any QC issues detected in the video segment(s) and/or information about any QC issues detected in the video segment(s). Non-limiting examples of QC issues that can be detected in the video segment(s) and included/indicated/identified in the QC information can include black video frames, frozen video frames, audio issues (e.g., missing audio channel or monophonic sound, silent/muted audio, missing sound, corrupt sound, volume issues, noise, audio distortions, etc.), out-of-sync content (e.g., out-of-sync video and audio; out-of-sync video and audio-related text data; out-of-sync audio and audio-related text data; out-of-sync audio-related text data, audio, and video; out-of-sync media signals, etc.), errors in the audio-related text data (e.g., a grammatical error, incorrect text in the audio-related text data, a mistake in a portion(s) of the audio-related text data that was translated from an audio of the video segment(s), a mistake in a portion(s) of the audio-related text data that was transcribed from an audio of the video segment(s), etc.), stuck or dead pixels, cropped images, screen tearing, aliasing, video flicker, image/video ghosting, video distortions, interlacing issues, jitter, loss of picture information and/or details, macroblocking, pixelation, image/video blur, choppy and/or jerky video playback, and/or any other QC issues.

At step 604, the detector 440 can determine, based on the QC information associated with the video segment(s), whether the detector 440 detected any QC issues in the video segment(s). For example, as previously explained, the QC information can include an indication and/or information about any QC issues detected in the video segment(s). The detector 440 can thus use the QC information to determine whether any QC issues were detected in the video segment (s).

If the detector 440 determines that no QC issues were detected in the video segment(s), the method 600 can proceed to step 606. At step 606, the detector 440 can delete from local storage any data used to determine the QC information for the video segment(s). The detector 440 can remove such data to increase the amount of local storage space available to store other data. Moreover, the data deleted by the detector 440 at step 606 can include, for example and without limitation, the video segment(s), one or more media content items and/or signals generated and/or extracted from the video segment(s) and used to generate the QC information (e.g., images generated from the video segment(s), any audio asset and/or audio signal associated with the video segment(s), any video frames and/or signals associated with the video segment(s), audio-related text data associated with the video segment(s), any audio and/or video feeds associated with the video segment(s), etc.), metadata, processing parameters, the QC information (or a portion thereof), any intermediate files generated by the detector 440 when generating the QC information, and/or any other data associated with the video segment(s) and/or used to determine the QC information associated with the video segment(s).

If the detector 440 determines that a QC issue(s) was/were detected in the video segment(s), the method 600 can proceed to step 608. At step 608, the detector 440 can upload the video and/or the video segment(s) containing the QC issue(s) detected to a remote system, such as a cloud system or a remote server. The remote system can include one or more devices and/or networks used to store videos and/or video segments that have QC issues and/or used to correct QC issues detected in videos and/or video segments. For example, the detector 440 can upload the video and/or the video segment(s) to the content servers 120 shown in FIG. 1A, the system servers 126 shown in FIG. 1A, and/or a cloud network implementing the network architecture 150 shown in FIG. 1B.

At step 610, the detector 440 can create a record(s) of the QC issue(s) detected in the video segment(s). The record(s) can include information about the QC issue(s) detected in the video segment(s). For example, the record(s) can include, for each QC issue detected in the video segment(s), a description of the QC issue, an indication of the video segment(s) determined to contain the QC issue, a copy of the video segment(s), a first timestamp identifying a start time within the video segment(s) when the QC issue starts, a second timestamp identifying an end time within the video segment(s) when the QC issue ends, an identifier of the video associated with the video segment(s), a copy of the video, metadata associated with the video and/or the video segment(s), a record identifier, an identifier of the video and/or the video segment(s), an identifier of the QC issue, a cause of the QC issue, a suggested action to correct or address the QC issue, a time when the QC issue was detected, an indication of a channel associated with the QC issue, a type of content associated with the QC issue, a type of video of the video associated with the vide segment(s), a tag associated with the video and/or the video segment(s), and/or any other information about the QC issue, the video, and/or the video segment(s).

At step 612, the detector 440 can optionally generate an alert associated with the QC issue(s) detected. For example, the detector 440 can optionally generate an alert identifying the QC issue(s) detected, identifying the video segment(s) containing the QC issue(s), identifying the video associated with the video segment(s), identifying the record(s) created for the QC issue(s), indicating that a QC issue(s) was detected in the video segment(s), notifying a user and/or system about the QC issue(s), requesting an action or response to the QC issue(s) detected, and/or providing any other alert/notification information.

After completing step 610 or optionally completing step 612, if there are any other video segments to be processed by the detector 440, the method 600 can return to step 602 where the detector 440 can generate QC information for another video segment(s) of the video, such as a next video segment(s). The detector 440 can perform steps 602 through 610 (and optionally step 612) based on the other video segment(s) and, if there are any additional video segments to be processed after completing step 610 (and optionally step 612), the detector 440 can again return to step 602 to process the additional video segments and complete steps 602 through 610 (and optionally step 612) until there are no more video segments to be processed by the detector 440.

FIG. 7 is a flowchart illustrating an example method 700 for performing automated quality control of media content, according to some examples of the present disclosure. The method 700 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the method 700. Further, some of the steps may be performed simultaneously, or in a different order than shown in FIG. 7, as will be understood by a person of ordinary skill in the art. Method 700 shall be described with reference to FIGS. 3 and 4. However, method 700 is not limited to those examples.

At step 702, the recorder 405 running at the worker node 170A can segment, via thread 410, the video(s) 412 into a set of video segments. The set of video segments can include a sequence of video segments. In some examples, each video segment from the set of video segments can include video content (e.g., video frames) and corresponding audio content. Moreover, the thread 410 implemented by the recorder 405 can obtain the video(s) 412 from a video source (e.g., content servers 120, the Internet, a content repository or library, etc.) and segment the video(s) 412 into video segments to be processed for QC issues, as further described herein.

The video segments can have fixed or varying lengths, durations, intervals, or sizes. In an illustrative example, the thread 410 can segment the video(s) 412 based on fixed intervals, such as n minute intervals (or any other intervals and/or interval units), where n represents a positive number that is greater than one. For example, if the n minute intervals are five-minute intervals, each of the video segments can have a fixed five-minute duration or length based on the fixed five-minute intervals. In another illustrative example, some or all of the video segments can be based on varying intervals and/or can have varying lengths/durations.

In some cases, when segmenting the video(s) 412 into video segments, the thread 410 can segment every portion of the video(s) 412 to generate video segments for the entire video(s) 412. In other cases, when segmenting the video(s) 412 into video segments, the thread 410 can segment a subset of the video(s) 412 and exclude one or more portions of the video(s) 412 to generate video segments for the subset of the video(s) 412 excluding the one or more portions of the video(s) 412. In some examples, the thread 410 can determine what (if any) portion(s) of the video(s) 412 to exclude based on keywords used to identify portions of the video(s) 412 that should be omitted from the segmentation, such as placeholders/slots in the video(s) 412 for inserting secondary content (e.g., advertisements, invitational content items, banners, etc.) and/or other content in the video(s) 412 (e.g., in such placeholder(s)/slot(s) in the video(s) 412).

For example, the system or a user can specify certain keywords that may indicate that a portion of the video(s) 412 containing such keywords corresponds to a certain type of content item or content placement slot, such as an advertisement, an advertisement slot, a bumper item, a video transition, a video introduction, a video recap, a video error/failure, etc. Non-limiting examples of keywords can include the terms break (e.g., after the break, when we return from the break, etc.), back (e.g., we will be right back), right (e.g., we will right back), commercial, advertisement, watching (e.g., you are watching), begin (e.g., the video will begin shortly), continue (e.g., the video will continue shortly), maintenance (e.g., this portion of the video is under maintenance, we will return after maintenance, etc.), local, under, live, we will (or we'll), among others.

The thread 410 can search the video(s) 412 for text in the video(s) 412 that matches any of the keywords and, if a portion of the video(s) 412 has text that matches one or more keywords, the thread 410 can exclude that portion of the video(s) 412 from the segmentation such that the video segments created by the thread 410 do not include a video segment corresponding to that portion of the video(s) 412. The text associated with that portion of the video(s) 412 can include text displayed in that portion of the video(s) 412 and/or audio-related text associated with that portion of the video(s) 412, such as subtitles or closed captions. In some cases, the thread 410 can additionally or alternatively search an audio of the video(s) 412 for any utterances containing any of the keywords. If the thread 410 finds an utterance containing a keyword, the thread 410 can exclude a portion of the video(s) 412 corresponding to the utterance containing the keyword.

In some examples, segmenting the video into the set of video segments can include adding each video segment from the set of video segments to a storage used to store the set of video segments. In some cases, a video segment can be added to the storage as the video segment is created by the thread 410 implemented by the recorder 405.

At step 704, the recorder 405 can provide, via the thread 420 implemented by the recorder 405, each video segment from the set of video segments to the detector 440 implemented by the worker node 170A. The thread 420 can run at least partially in parallel to or concurrently with the thread 410. Thus, the recorder 405 can provide each video segment to the detector 440 via the thread 420 at least partially in parallel to or concurrently with performing the segmentation at step 702 via the thread 410.

At step 706, as the thread 420 of the recorder 405 provides each video segment from the set of video segments to the detector 440 (or after the thread 420 provides each video segment), the recorder 405 can remove, from storage via the thread 430 implemented by the recorder 405, one or more video segments provided to the detector 440 via the thread 420 implemented by the recorder 405. The one or more video segments provided to the detector 440 and removed at step 706 can include the video segment being provided to the detector 440 at step 704 and/or any video segment(s) previously provided to the detector 440. For example, when (or after) the thread 420 provides a new video segment to the detector 440 at step 704, the thread 430 can remove that video segment from storage. In some cases, the one or more video segments provided to the detector 440 and removed from storage at step 706 can include one or more video segments that have been provided to the detector 440 and/or processed by the detector 440.

The storage containing the one or more video segments removed at step 706 can include a storage used to store the set of video segments as they are created and saved by the thread 410 implemented by the recorder 405. Moreover, in some examples, the thread 410, the thread 420, and the thread 430 can be implemented by the recorder 405 at least partially concurrently with each other. In some cases, the worker node 170A implementing the recorder 405 (and the threads 410, 420, and 430) and the detector 440 can include a software container or VM used to implement the recorder 405 and the detector 440.

In some examples, removing the one or more video segments from storage can include determining, via the thread 430 implemented by the recorder 405, that the thread 410 implemented by the recorder 405 has added the one or more video segments to storage and the thread 420 implemented by the recorder 405 has provided the one or more video segments to the detector 440; and in response to determining that the thread 410 has added the one or more video segments to storage and the thread 420 has provided the one or more video segments to the detector 440, removing, via the thread 430, the one or more video segments from the storage.

At step 708, for each video segment from the set of video segments received by the detector 440, determining, via the detector 440, whether that video segment contains a QC issue. The QC issue can include, for example and without limitation, monophonic sound, silent audio, black video frames, frozen video frames, out-of-sync video and audio content, out-of-sync audio-related text data (e.g., closed captions, subtitles) and video and/or audio content, and/or an error in the audio-related text data.

In some aspects, the detector 440 can determine, for each video segment, whether the video segment includes an audio QC issue (e.g., monophonic sound, silent/muted audio, etc.) based on an audio waveform(s) of audio (and/or an audio channel) associated with the video segment. For example, in some cases, to determine, for each video segment, whether the video segment includes a QC issue, the detector 440 can determine that the video segment has/contains monophonic sound based on a comparison between a first audio waveform associated with a first audio channel of the video segment and a second audio waveform associated with a second audio channel of the video segment. In this example, if the detector 440 determines that the video segment has/contains monophonic sound, the detector 440 can determine that the video segment has a QC issue, which in this example includes monophonic sound (e.g., a monophonic sound QC issue).

In some cases, to determine that the video segment has monophonic sound, the detector 440 can determine that the first audio waveform has less energy than the second audio waveform, a lower amplitude than the second audio waveform, a lower frequency than the second audio waveform, and/or a flatter wave than a wave associated with the second audio waveform; and determine that the video has monophonic sound based on the determining that the first audio waveform has less energy than the second audio waveform, the lower amplitude than the second audio waveform, the lower frequency than the second audio waveform, and/or the flatter wave than the wave associated with the second audio waveform.

In some aspects, the detector 440 can determine that the audio includes silent/muted audio based on an audio waveform of audio associated with the video segment and, based on the determination that the audio includes silent/muted audio, determine that the video segment contains silent/muted audio. In this example, the QC issue associated with the video segment can include silent/muted audio (e.g., a silent/muted audio QC issue). In some cases, the detector 440 can determine that a length of a portion of the audio containing the silent/muted audio exceeds a threshold length and, based on the determination that the length of the portion of the audio containing the silent/muted audio exceeds the threshold length, determine that the video segment contains a QC issue, which in this example can include or refer to silent/muted audio (e.g., a silent/muted audio QC issue).

In this example, the detector 440 can verify that the length of the portion of the audio containing the silent/muted audio exceeds the threshold length to avoid designating the video segment as having a silent/muted audio QC issue if the portion of the video segment containing the silent/muted audio (or containing audio with a volume that is less than or equal to a threshold volume used to identify silent/muted audio QC issues) is too short/brief to consider a QC issue, is not long enough to result in sufficient disruption to or degradation of the user's experience to consider a QC issue, is intentional (e.g., that portion of the video segment is intended to be silent or have audio with less than a threshold volume), and/or should not be designated as a silent/muted audio QC issue (e.g., should be ignored or filtered from designation as an audio QC issue). The threshold length can include a length/duration or interval designated as a threshold for detecting audio QC issues, such as silent/muted audio QC issues, monophonic sound QC issues, etc. In some aspects, the threshold length can exclude and/or can be configured to exclude scenarios where a video segment has an audio issue, such as a silent/muted audio (or an audio volume that is less than or equal to a threshold volume), for a period that is too short to consider a QC issue; too short to be considered (and/or have a sufficient likelihood of being) unintentional, an error, or a problem/problematic; too short to be disruptive (and/or have a negative impact) to users that consume such content; etc.

In some examples, determining that the video segment includes silent/muted audio can include determining that the audio waveform is a flat wave or a wave representing an audio volume that is lower than a threshold volume. The threshold volume can be used to control the level of volume that should be treated or considered as silent or muted audio (e.g., even if the audio is not muted or entirely silent). For example, if the volume of an audio portion is below the threshold volume, the volume of that audio portion may be so low as to be considered silent or muted even if not entirely silent or muted. The threshold volume may depend on the type of scene, the content of the audio, user and/or system preferences, and/or one or more audio volumes that are so low that such audio volumes are considered silent audio. Thus, the detector 440 can determine that the video segment contains a silent/mute audio QC issue if/when an audio associated with an audio signal(s) and/or asset(s) corresponding to the video segment is muted or completely silent but, in some cases, the detector 440 can also determine that the video segment contains a silent/muted audio QC issue if/when the audio associated with the audio signal(s) and/or asset(s) corresponding to the video segment is not muted or completely silent, such as when such audio has a volume that is less than or equal to a threshold volume (e.g., when a volume of the audio is below (or equal to) a certain volume specified as a threshold volume for determining if the volume of the audio is low enough to consider the audio as silent or muted), as previously described.

In some aspects, to determine, for each video segment, whether the video segment includes the QC issue, the detector 440 can convert the video segment into a sequence of images and, for each image from the sequence of images, determine whether the image is, represents, or includes a black video frame. In some examples, the image can be determined to be, represent, or include a black video frame when a threshold amount or ratio of pixels of the image has a pixel value that represents a black color (e.g., a pixel value of 0) or is lower than a threshold pixel value. The threshold pixel value can include a black color limit, a black color and/or intensity range, a black color intensity limit, a brightness range, a certain amount of black color or black color level relative to a full black (or completely black) color or color level (e.g., relative to a black color pixel with a pixel value representing full black such as a pixel value of 0), and/or a brightness limit set to allow different color levels, brightness levels, shades, and/or intensities of black to be treated as black pixels/colors (e.g., rather than only a full black pixel/color such as a pixel value of 0) for the purposes of determining whether an image includes a black video frame. In some cases, determining whether the video segment includes the QC issue can also include determining that one or more images from the sequence of images include black video frames and, based on a determination that the one or more images include black video frames, determining that the video segment includes black video frames, where the black video frames represent a QC issue associated with the video segment (e.g., a black video frames QC issue).

In some cases, the detector 440 can determine whether a portion of the video segment corresponding to the black video frames has a playback duration that exceeds a threshold, and determining that the video segment contains black video frames (which represent the QC issue associated with the video segment) based on a determination that the portion of the video segment corresponding to the black video frames has a playback duration that exceeds the threshold. The threshold can be set to specify a minimum duration of a video portion for such video portion to be classified as having a black video frames QC issue in order to exclude video portions that are considered too short to designate as having a black video frames QC issue even if one or more frames from such video portions can be classified as black video frames.

In some aspects, to determine, for each video segment, whether the video segment includes the QC issue, the detector 440 can convert the video segment into a set of images and determine whether two or more sequential images (e.g., two or more adjacent images within a sequence associated with the video segment and/or the set of images, two or more consecutive images, two or more images that are temporally adjacent or neighboring, etc.) have less than a threshold difference. For example, the detector 440 can convert a sequence of video frames corresponding to the video segment into a set of images and compare images in the set of images to determine whether two or more sequential images have less than a threshold difference, such as a threshold amount of motion, a threshold amount of picture changes, threshold amount of pixel changes, etc.

In some aspects, to determine, for each video segment, whether the video segment includes the QC issue, the detector 440 can convert the video segment into a set of images; determine whether two or more sequential images from the set of images are the same or have less than a threshold amount of motion; in response to determining that two or more sequential images from the set of images are the same or have less than the threshold amount of motion, determining that the video segment includes frozen video frames. Here, the QC issue associated with the video segment can include frozen video frames (e.g., a frozen video frames QC issue). In some cases, the detector 440 can determine, based on a determination that a playback duration of a video portion corresponding to the two or more sequential images exceeds a threshold, that the video segment contains frozen video frames (which represent the QC issue associated with the video segment).

In some cases, the detector 440 can determine whether two or more sequential images match (e.g., are the same) or have less than a threshold difference (e.g., a threshold amount of motion) by comparing the two or more sequential images and determining whether the two or more sequential images contain a certain amount of differences and/or changes, such as differences or changes indicative of motion or lack thereof. In some examples, to determine whether two or more sequential images have less than a threshold difference, the detector 440 can determine whether the two or more sequential images have a threshold amount of motion, which can represent or constitute the threshold difference. In some cases, the detector 440 can determine whether the two or more sequential images have less than the threshold amount of motion based on an optical flow determined for the two or more sequential images.

At step 710, the detector 440 can generate QC data including information about one or more QC issues detected by the detector 440. For example, the detector 440 can generate QC data including information about each QC issue detected by the detector 440. In some cases, the QC data can include one or more records containing the information about the one or more QC issues detected by the detector 440.

In some examples, the information about the one or more QC issues detected by the detector 440 can include, for each QC issue from the one or more QC issues, a description of the QC issue, an indication of the respective video segment (s) determined to have the QC issue, a first timestamp identifying a start time within the respective video segment when the QC issue starts, a second timestamp identifying an end time within the respective video segment when the QC issue ends, an identifier of the video associated with the respective video segment, and/or a channel associated with the QC issue.

Example Computer System

Figure 8:
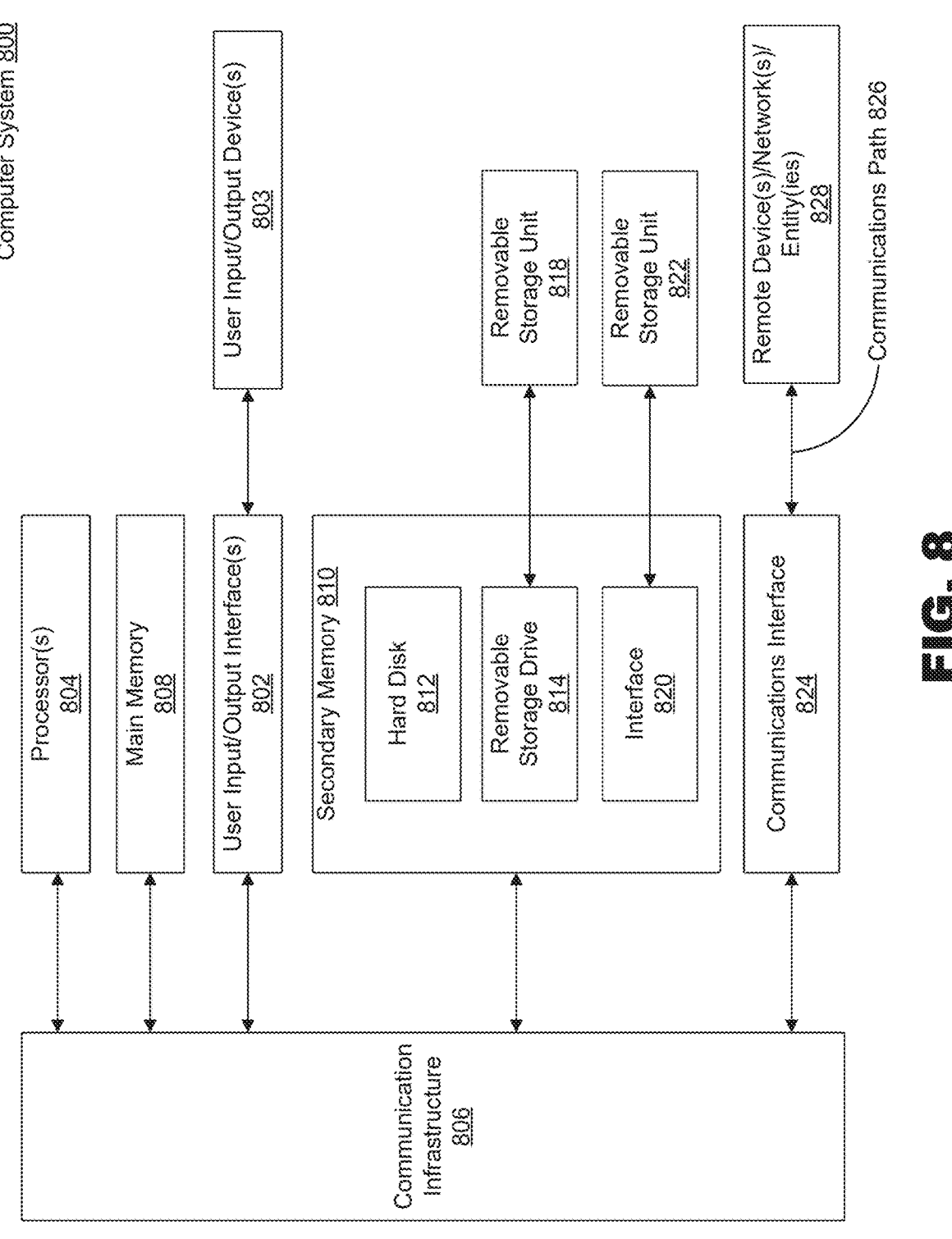
FIG. 8 illustrates an example computer system that can be used for implementing various aspects of the present disclosure.

Various aspects and examples may be implemented, for example, using one or more well-known computer systems, such as computer system 800 shown in FIG. 8. For example, any of the media device(s) 106, the content servers 120, the system servers 126, the nodes 170, the master node 175, and/or any device or devices implementing the nodes 170 and/or the master node 175 may be implemented using combinations or sub-combinations of computer system 800. Also or alternatively, computer system 800 may be used, for example, to implement any of the aspects and examples discussed herein, as well as combinations and sub-combinations thereof.

Computer system 800 may include one or more processors (e.g., central processing units or CPUs), such as processor 804. Processor 804 may be connected to a communication infrastructure 806 (or communication bus).

Computer system 800 may also include user input/output device(s) 803, such as monitors, keyboards, pointing devices, etc., which may communicate with communication infrastructure 806 through user input/output interface(s) 802.

In some examples, the one or more processors 804 may include a graphics processing unit (GPU). In some examples, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc. In other examples, the one or more processors 804 may additionally or alternatively include or be part of a digital signal processor (DSP), an image signal processor (ISP), an application-specific integrated circuit (ASIC), a field-programmable gate array (FPGA), an integrated circuit, a microcontroller, and/or any other processing device.

Computer system 800 may also include a main or primary memory 808, such as random access memory (RAM). Main memory 808 may include one or more levels of cache. Main memory 808 may have stored therein control logic (e.g., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 800 may include a communication or network interface 824. Communication interface 824 may enable computer system 800 to communicate and interact with any combination of external devices, external networks, external entities, etc. (individually and collectively referenced by reference number 828). For example, communication interface 824 may allow computer system xx00 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, mobile phone (e.g., smartphone), smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800 or processor(s) 804), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

The breadth and scope of this disclosure should not be limited by any of the above-described exemplary embodiments, but should be defined only in accordance with the following claims and their equivalents.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: memory; and one or more processors are coupled to the memory and configured to perform operations comprising: segmenting, via a first thread of execution implemented by a first program running at a compute node, a video into a set of video segments, each video segment from the set of video segments comprising video content and corresponding audio content; providing, via a second thread of execution implemented by the first program, each video segment from the set of video segments to a second program running at the compute node; as the second thread of execution implemented by the first program provides each video segment from the set of video segments to the second program, removing, from storage via a third thread of execution implemented by the first program, one or more video segments provided to the second program by the second thread of execution implemented by the first program; for each video segment from the set of video segments received by the second program, determining, via the second program, whether that video segment contains a quality control (QC) issue, the QC issue comprising at least one of monophonic sound, silent or muted audio, black video frames, and frozen video frames; and generating QC data comprising information about one or more QC issues detected by the second program.

Aspect 2. The system of Aspect 1, wherein the information about one or more QC issues detected by the second program comprises, for each QC issue from the one or more QC issues, at least one of a description of the QC issue, an indication of a respective video segment determined to have the QC issue, a first timestamp identifying a start time within the respective video segment when the QC issue starts, a second timestamp identifying an end time within the respective video segment when the QC issue ends, an identifier of the video associated with the respective video segment, and a channel associated with the QC issue.

Aspect 3. The system of any of Aspects 1 to 2, wherein segmenting the video further comprises adding each video segment from the set of video segments to the storage as that video segment is created by the first thread of execution implemented by the first program, and wherein removing the one or more video segments from the storage comprises: determining that the first thread of execution implemented by the first program has added the one or more video segments to the storage and the second thread of execution implemented by the first program has provided the one or more video segments to the second program; and in response to determining that the first thread of execution has added the one or more video segments to the storage and the second thread of execution has provided the one or more video segments to the second program, removing the one or more video segments from the storage.

Aspect 4. The system of any of Aspects 1 to 3, wherein determining, for each video segment, whether the video segment includes the QC issue comprises: based on a comparison between a first audio waveform associated with a first audio channel of the video segment and a second audio waveform associated with a second audio channel of the video segment, determining that the video segment has monophonic sound, wherein the QC issue associated with the video segment comprises monophonic sound.

Aspect 5. The system of Aspect 4, wherein determining that the video segment has monophonic sound further comprises: determining that the first audio waveform has at least one of less energy than the second audio waveform, a lower amplitude than the second audio waveform, a lower frequency than the second audio waveform, and a flatter wave than a wave associated with the second audio waveform; and determining that the video segment has monophonic sound based on the determining that the first audio waveform has at least one of less energy than the second audio waveform, the lower amplitude than the second audio waveform, the lower frequency than the second audio waveform, and the flatter wave than the wave associated with the second audio waveform.

Aspect 6. The system of any of Aspects 1 to 5, wherein determining, for each video segment, whether the video segment includes the QC issue comprises: based on an audio waveform of an audio associated with the video segment, determining that the audio comprises silent or muted audio; and based on a determination that a length of a portion of the audio that includes the silent or muted audio exceeds a threshold, determining that the video segment contains silent or muted audio, wherein the QC issue associated with the video segment comprises silent or muted audio.

Aspect 7. The system of Aspect 6, wherein determining that the video segment comprises silent or muted audio further comprises determining that the audio waveform comprises a flat wave or a wave representing an audio volume that is lower than a threshold volume.

Aspect 8. The system of any of Aspects 1 to 7, wherein determining, for each video segment, whether the video segment includes the QC issue comprises: converting the video segment into a sequence of images; for each image from the sequence of images, determining whether the image comprises a black video frame, wherein the image is determined to comprise the black video frame when a threshold amount or ratio of pixels of the image has a pixel value that represents a black color or is lower than a threshold pixel value; determining that one or more images from the sequence of images comprise black video frames; and based on a determination that the one or more images comprising black video frames correspond to a portion of the video segment that has a playback duration that exceeds a threshold, determining that the video segment contains the QC issue, the QC issue comprising black video frames.

Aspect 9. The system of any of Aspects 1 to 8, wherein determining, for each video segment, whether the video segment includes the QC issue comprises: converting the video segment into a set of images; determining whether two or more sequential images from the set of images have less than a threshold difference; and in response to determining that two or more sequential images from the set of images have less than the threshold difference, determining that the video segment includes frozen video frames, wherein the QC issue associated with the video segment comprises frozen video frames.

Aspect 10. The system of any of Aspects 1 to 9, wherein the compute node running the first program and the second program comprises a software container or a virtual machine, and wherein the first thread of execution, the second thread of execution, and the third thread of execution are implemented by the first program at least partially concurrently with each other.

Aspect 11. A computer-implemented method comprising: segmenting, via a first thread of execution implemented by a first program implemented by a compute node, a video into a set of video segments, each video segment from the set of video segments comprising video content and corresponding audio content; providing, via a second thread of execution implemented by the first program, each video segment from the set of video segments to a second program running at the compute node; as the second thread of execution implemented by the first program provides each video segment from the set of video segments to the second program, removing, from storage via a third thread of execution implemented by the first program, one or more video segments provided to the second program by the second thread of execution implemented by the first program; for each video segment from the set of video segments received by the second program, determining, via the second program, whether that video segment contains a quality control (QC) issue, the QC issue comprising at least one of monophonic sound, silent or muted audio, black video frames, and frozen video frames; and generating QC data comprising information about one or more QC issues detected by the second program.

Aspect 12. The computer-implemented method of Aspect 11, wherein the information about one or more QC issues detected by the second program comprises, for each QC issue from the one or more QC issues, at least one of a description of the QC issue, an indication of a respective video segment determined to have the QC issue, a first timestamp identifying a start time within the respective video segment when the QC issue starts, a second timestamp identifying an end time within the respective video segment when the QC issue ends, an identifier of the video associated with the respective video segment, and a channel associated with the QC issue, and wherein the first thread of execution, the second thread of execution, and the third thread of execution are implemented by the first program at least partially concurrently with each other.

Aspect 13. The computer-implemented method of any of Aspects 11 to 12, wherein segmenting the video further comprises adding each video segment from the set of video segments to the storage as that video segment is created by the first thread of execution implemented by the first program, and wherein removing the one or more video segments from the storage comprises: determining that the first thread of execution implemented by the first program has added the one or more video segments to the storage and the second thread of execution implemented by the first program has provided the one or more video segments to the second program; and in response to determining that the first thread of execution has added the one or more video segments to the storage and the second thread of execution has provided the one or more video segments to the second program, removing the one or more video segments from the storage.

Aspect 14. The computer-implemented method of any of Aspects 11 to 13, wherein determining, for each video segment, whether the video segment includes the QC issue comprises: based on a comparison between a first audio waveform associated with a first audio channel of the video segment and a second audio waveform associated with a second audio channel of the video segment, determining that the video segment has monophonic sound, wherein the QC issue associated with the video segment comprises the monophonic sound.

Aspect 15. The computer-implemented method of Aspect 14, wherein determining that the video segment has monophonic sound further comprises: determining that the first audio waveform has at least one of less energy than the second audio waveform, a lower amplitude than the second audio waveform, a lower frequency than the second audio waveform, and a flatter wave than a wave associated with the second audio waveform; and determining that the video segment has monophonic sound based on the determining that the first audio waveform has at least one of less energy than the second audio waveform, the lower amplitude than the second audio waveform, the lower frequency than the second audio waveform, and the flatter wave than the wave associated with the second audio waveform.

Aspect 16. The computer-implemented method of any of Aspects 11 to 15, wherein determining, for each video segment, whether that video segment includes the QC issue comprises: based on an audio waveform of an audio associated with the video segment, determining that a portion of the audio comprises silent or muted audio; and based on a determination that a length of the portion of the audio that comprises silent or muted audio exceeds a threshold, determining that the video segment contains silent or muted audio, wherein the QC issue associated with the video segment comprises silent or muted audio.

Aspect 17. The computer-implemented method of Aspect 16, wherein determining that the video segment contains silent or muted audio further comprises determining that the audio waveform comprises a flat wave or a wave representing audio that has a volume that is lower than a threshold volume.

Aspect 18. The computer-implemented method of any of Aspects 11 to 17, wherein determining, for each video segment, whether the video segment includes the QC issue comprises: converting the video segment into a sequence of images; for each image from the sequence of images, determining whether the image comprises a black video frame, wherein the image is determined to comprise the black video frame when a threshold amount or ratio of pixels of the image has a pixel value that represents a black color or is lower than a threshold pixel value; determining that one or more images from the sequence of images comprise black video frames; and based on the determining that the one or more images comprise black video frames, determining that the video segment contains black video frames, wherein the QC issue associated with the video segment comprises black video frames.

Aspect 19. The computer-implemented method of any of Aspects 11 to 18, wherein determining, for each video segment, whether the video segment includes the QC issue comprises: converting the video segment into a set of images; determining whether two or more sequential images from the set of images have less than a threshold difference; and in response to determining that two or more sequential images from the set of images have less than the threshold difference, determining that the video segment includes frozen video frames, wherein the QC issue associated with the video segment comprises frozen video frames.

Aspect 20. The computer-implemented method of any of Aspects 11 to 19, wherein the compute node running the first program and the second program comprises a software container or a virtual machine.

Aspect 21. The computer-implemented method of any of Aspects 11 to 20, wherein the first thread of execution, the second thread of execution, and the third thread of execution are implemented by the first program at least partially concurrently with each other.

Aspect 22. A non-transitory computer-readable medium having instructions stored thereon that, when executed by one or more processors, cause the one or more processors to perform a method according to any of Aspects 11 to 21.

Aspect 23. A system comprising means for performing a method according to any of Aspects 11 to 21.

Aspect 24. A computer-program product comprising computer-executable instructions which, when executed by one or more processors, cause the one or more processors to perform a method according to any of Aspects 11 to 21.

What is claimed is:

1. A system comprising:

memory; and one or more processors are coupled to the memory and configured to perform operations comprising:

segmenting, via a first thread of execution implemented by a first program running at a compute node, a video into a set of video segments, each video segment from the set of video segments comprising video content and corresponding audio content;

providing, via a second thread of execution implemented by the first program, each video segment from the set of video segments to a second program running at the compute node;

as the second thread of execution implemented by the first program provides each video segment from the set of video segments to the second program, removing, from storage via a third thread of execution implemented by the first program, one or more video segments provided to the second program by the second thread of execution implemented by the first program;

for each video segment from the set of video segments received by the second program, determining, via the second program, whether that video segment contains a quality control (QC) issue, the QC issue comprising at least one of monophonic sound, silent or muted audio, black video frames, and frozen video frames; and generating QC data comprising information about one or more QC issues detected by the second program.

2. The system of claim 1, wherein the information about one or more QC issues detected by the second program comprises, for each QC issue from the one or more QC issues, at least one of a description of the QC issue, an indication of a respective video segment determined to have the QC issue, a first timestamp identifying a start time within the respective video segment when the QC issue starts, a second timestamp identifying an end time within the respective video segment when the QC issue ends, an identifier of the video associated with the respective video segment, and a channel associated with the QC issue.

3. The system of claim 1, wherein segmenting the video further comprises adding each video segment from the set of video segments to the storage as that video segment is created by the first thread of execution implemented by the first program, and wherein removing the one or more video segments from the storage comprises:

determining that the first thread of execution implemented by the first program has added the one or more video segments to the storage and the second thread of execution implemented by the first program has provided the one or more video segments to the second program; and in response to determining that the first thread of execution has added the one or more video segments to the storage and the second thread of execution has provided the one or more video segments to the second program, removing the one or more video segments from the storage.

4. The system of claim 1, wherein determining, for each video segment, whether the video segment includes the QC issue comprises:

based on a comparison between a first audio waveform associated with a first audio channel of the video segment and a second audio waveform associated with a second audio channel of the video segment, determining that the video segment has monophonic sound, wherein the QC issue associated with the video segment comprises monophonic sound.

5. The system of claim 4, wherein determining that the video segment has monophonic sound further comprises:

determining that the first audio waveform has at least one of less energy than the second audio waveform, a lower amplitude than the second audio waveform, a lower frequency than the second audio waveform, and a flatter wave than a wave associated with the second audio waveform; and determining that the video segment has monophonic sound based on the determining that the first audio waveform has at least one of less energy than the second audio waveform, the lower amplitude than the second audio waveform, the lower frequency than the second audio waveform, and the flatter wave than the wave associated with the second audio waveform.

6. The system of claim 1, wherein determining, for each video segment, whether the video segment includes the QC issue comprises:

based on an audio waveform of an audio associated with the video segment, determining that the audio comprises silent or muted audio; and based on a determination that a length of a portion of the audio that includes the silent or muted audio exceeds a threshold, determining that the video segment contains silent or muted audio, wherein the QC issue associated with the video segment comprises silent or muted audio.

7. The system of claim 6, wherein determining that the video segment comprises silent or muted audio further comprises determining that the audio waveform comprises a flat wave or a wave representing an audio volume that is lower than a threshold volume.

8. The system of claim 1, wherein determining, for each video segment, whether the video segment includes the QC issue comprises:

converting the video segment into a sequence of images;

for each image from the sequence of images, determining whether the image comprises a black video frame, wherein the image is determined to comprise the black video frame when a threshold amount or ratio of pixels of the image has a pixel value that represents a black color or is lower than a threshold pixel value;

US 12,610,095 B2

51

52 determining that one or more images from the sequence of images comprise black video frames; and based on a determination that the one or more images comprising black video frames correspond to a portion of the video segment that has a playback duration that exceeds a threshold, determining that the video segment contains the QC issue, the QC issue comprising black video frames.

9. The system of claim 1, wherein determining, for each video segment, whether the video segment includes the QC issue comprises:

converting the video segment into a set of images;

determining whether two or more sequential images from the set of images have less than a threshold difference; and in response to determining that two or more sequential images from the set of images have less than the threshold difference, determining that the video segment includes frozen video frames, wherein the QC issue associated with the video segment comprises frozen video frames.

10. The system of claim 1, wherein the compute node running the first program and the second program comprises a software container or a virtual machine, and wherein the first thread of execution, the second thread of execution, and the third thread of execution are implemented by the first program at least partially concurrently with each other.

11. A computer-implemented method comprising:

segmenting, via a first thread of execution implemented by a first program implemented by a compute node, a video into a set of video segments, each video segment from the set of video segments comprising video content and corresponding audio content;

providing, via a second thread of execution implemented by the first program, each video segment from the set of video segments to a second program running at the compute node;

as the second thread of execution implemented by the first program provides each video segment from the set of video segments to the second program, removing, from storage via a third thread of execution implemented by the first program, one or more video segments provided to the second program by the second thread of execution implemented by the first program;

for each video segment from the set of video segments received by the second program, determining, via the second program, whether that video segment contains a quality control (QC) issue, the QC issue comprising at least one of monophonic sound, silent or muted audio, black video frames, and frozen video frames; and generating QC data comprising information about one or more QC issues detected by the second program.

12. The computer-implemented method of claim 11, wherein the information about one or more QC issues detected by the second program comprises, for each QC issue from the one or more QC issues, at least one of a description of the QC issue, an indication of a respective video segment determined to have the QC issue, a first timestamp identifying a start time within the respective video segment when the QC issue starts, a second timestamp identifying an end time within the respective video segment when the QC issue ends, an identifier of the video associated with the respective video segment, and a channel associated with the QC issue, and wherein the first thread of execution, the second thread of execution, and the third thread of execution are implemented by the first program at least partially concurrently with each other.

13. The computer-implemented method of claim 11, wherein segmenting the video further comprises adding each video segment from the set of video segments to the storage as that video segment is created by the first thread of execution implemented by the first program, and wherein removing the one or more video segments from the storage comprises:

determining that the first thread of execution implemented by the first program has added the one or more video segments to the storage and the second thread of execution implemented by the first program has provided the one or more video segments to the second program; and in response to determining that the first thread of execution has added the one or more video segments to the storage and the second thread of execution has provided the one or more video segments to the second program, removing the one or more video segments from the storage.

14. The computer-implemented method of claim 11, wherein determining, for each video segment, whether the video segment includes the QC issue comprises:

based on a comparison between a first audio waveform associated with a first audio channel of the video segment and a second audio waveform associated with a second audio channel of the video segment, determining that the video segment has monophonic sound, wherein the QC issue associated with the video segment comprises the monophonic sound.

15. The computer-implemented method of claim 14, wherein determining that the video segment has monophonic sound further comprises:

determining that the first audio waveform has at least one of less energy than the second audio waveform, a lower amplitude than the second audio waveform, a lower frequency than the second audio waveform, and a flatter wave than a wave associated with the second audio waveform; and determining that the video segment has monophonic sound based on the determining that the first audio waveform has at least one of less energy than the second audio waveform, the lower amplitude than the second audio waveform, the lower frequency than the second audio waveform, and the flatter wave than the wave associated with the second audio waveform.

16. The computer-implemented method of claim 11, wherein determining, for each video segment, whether that video segment includes the QC issue comprises:

based on an audio waveform of an audio associated with the video segment, determining that a portion of the audio comprises silent or muted audio; and based on a determination that a length of the portion of the audio that comprises silent or muted audio exceeds a threshold, determining that the video segment contains silent or muted audio, wherein the QC issue associated with the video segment comprises silent or muted audio.

17. The computer-implemented method of claim 16, wherein determining that the video segment contains silent or muted audio further comprises determining that the audio waveform comprises a flat wave or a wave representing audio that has a volume that is lower than a threshold volume.

18. The computer-implemented method of claim 11, wherein determining, for each video segment, whether the video segment includes the QC issue comprises:

converting the video segment into a sequence of images;

for each image from the sequence of images, determining whether the image comprises a black video frame, wherein the image is determined to comprise the black video frame when a threshold amount or ratio of pixels of the image has a pixel value that represents a black color or is lower than a threshold pixel value;

determining that one or more images from the sequence of images comprise black video frames; and based on the determining that the one or more images comprise black video frames, determining that the video segment contains black video frames, wherein the QC issue associated with the video segment comprises black video frames.

19. The computer-implemented method of claim 11, wherein determining, for each video segment, whether the video segment includes the QC issue comprises:

converting the video segment into a set of images;

determining whether two or more sequential images from the set of images have less than a threshold difference; and in response to determining that two or more sequential images from the set of images have less than the threshold difference, determining that the video segment includes frozen video frames, wherein the QC issue associated with the video segment comprises frozen video frames.

20. A non-transitory computer-readable medium having instructions stored thereon that, when executed by one or more processors, cause the one or more processors to perform operations comprising:

segmenting, via a first thread of execution implemented by a first program implemented by a compute node, a video into a set of video segments, each video segment from the set of video segments comprising video content and corresponding audio content;

providing, via a second thread of execution implemented by the first program, each video segment from the set of video segments to a second program running at the compute node;

as the second thread of execution implemented by the first program provides each video segment from the set of video segments to the second program, removing, from storage via a third thread of execution implemented by the first program, one or more video segments provided to the second program by the second thread of execution implemented by the first program;

for each video segment from the set of video segments received by the second program, determining, via the second program, whether that video segment contains a quality control (QC) issue, the QC issue comprising at least one of monophonic sound, silent or muted audio, black video frames, and frozen video frames; and generating QC data comprising information about one or more QC issues detected by the second program.

\* \* \* \* \*